United States Patent [19]

Small et al.

[11] Patent Number: 5,093,563

[45] Date of Patent: Mar. 3, 1992

[54] ELECTRONICALLY PHASED DETECTOR ARRAYS FOR OPTICAL IMAGING

[75] Inventors: James G. Small; Dennis R. Rossbach, both of Albuquerque

[73] Assignee: Hughes Aircraft Company, Los Angeles, Calif.

[21] Appl. No.: 321,661

[22] Filed: Mar. 3, 1989

Related U.S. Application Data

[63] Continuation-in-part of Ser. No. 011,182, Feb. 5, 1987, abandoned.

[51] Int. Cl.⁵ .......................... G01J 1/20; G02B 26/10
[52] U.S. Cl. .................................. 250/201.9; 250/332; 250/334; 250/349; 250/353; 358/212; 356/345; 356/349; 89/41.06
[58] Field of Search ................. 356/5, 152, 345, 349, 356/359; 342/196, 359; 250/330, 332, 334, 349, 353, 201.9; 358/212; 89/41.05, 41.06

[56] References Cited

U.S. PATENT DOCUMENTS

| H 637 | 6/1989 | Baciak | 356/345 X |
| 3,781,111 | 12/1973 | Fletcher et al. | 356/5 |
| 4,054,879 | 10/1977 | Wright et al. | 342/192 |
| 4,090,066 | 5/1978 | O'Meara | 250/199 |
| 4,099,879 | 7/1978 | Britz | 356/141 |
| 4,488,155 | 12/1984 | Wu | 342/157 X |
| 4,568,938 | 2/1986 | Ubriasco | 342/87 |
| 4,655,587 | 4/1987 | Wijntjes et al. | 356/346 |

*Primary Examiner*—Linda J. Wallace
*Attorney, Agent, or Firm*—William J. Streeter; Wanda K. Denson-Low

[57] ABSTRACT

An optical imaging system includes an array of small aperture subtelescopes each with heterodyne detectors. The array detects the amplitude and phase of light waves emanating from a scene under observation before they are combined into an image. The beam combining and interfering functions are performed after detection by the use of novel electronic signal processsing. Large-aperture resolution is synthesized by electronically detecting and correcting phase errors without optical phase compensating components. Parallel processing and atmospheric turbulence compensation are achieved. The system images laser illuminated or naturally illuminated targets as well as stationary or moving targets. The heterodyne detectors can also achieve similar results when arranged in a pupil plane array located behind a single large aperture telescope.

72 Claims, 18 Drawing Sheets

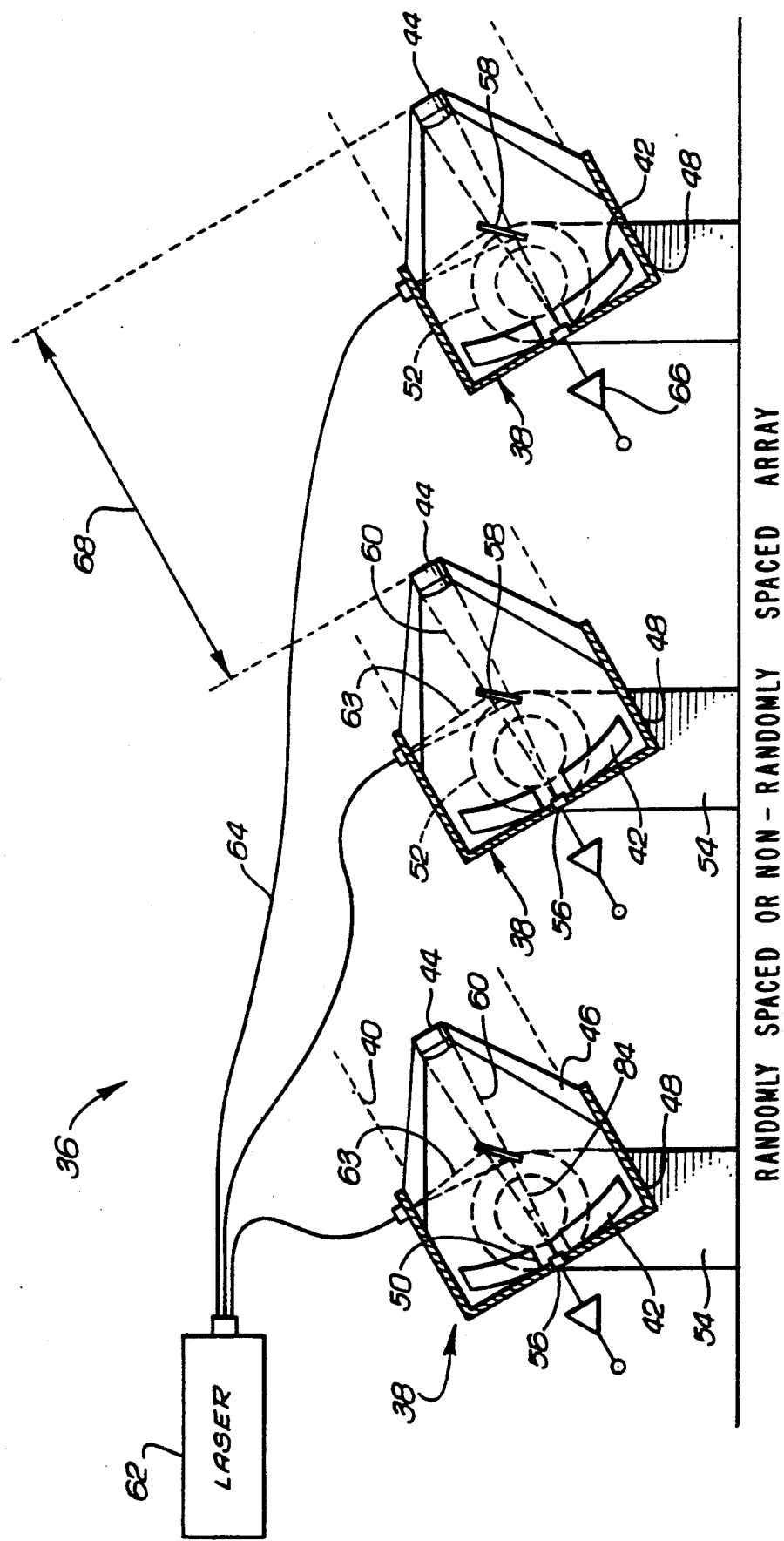

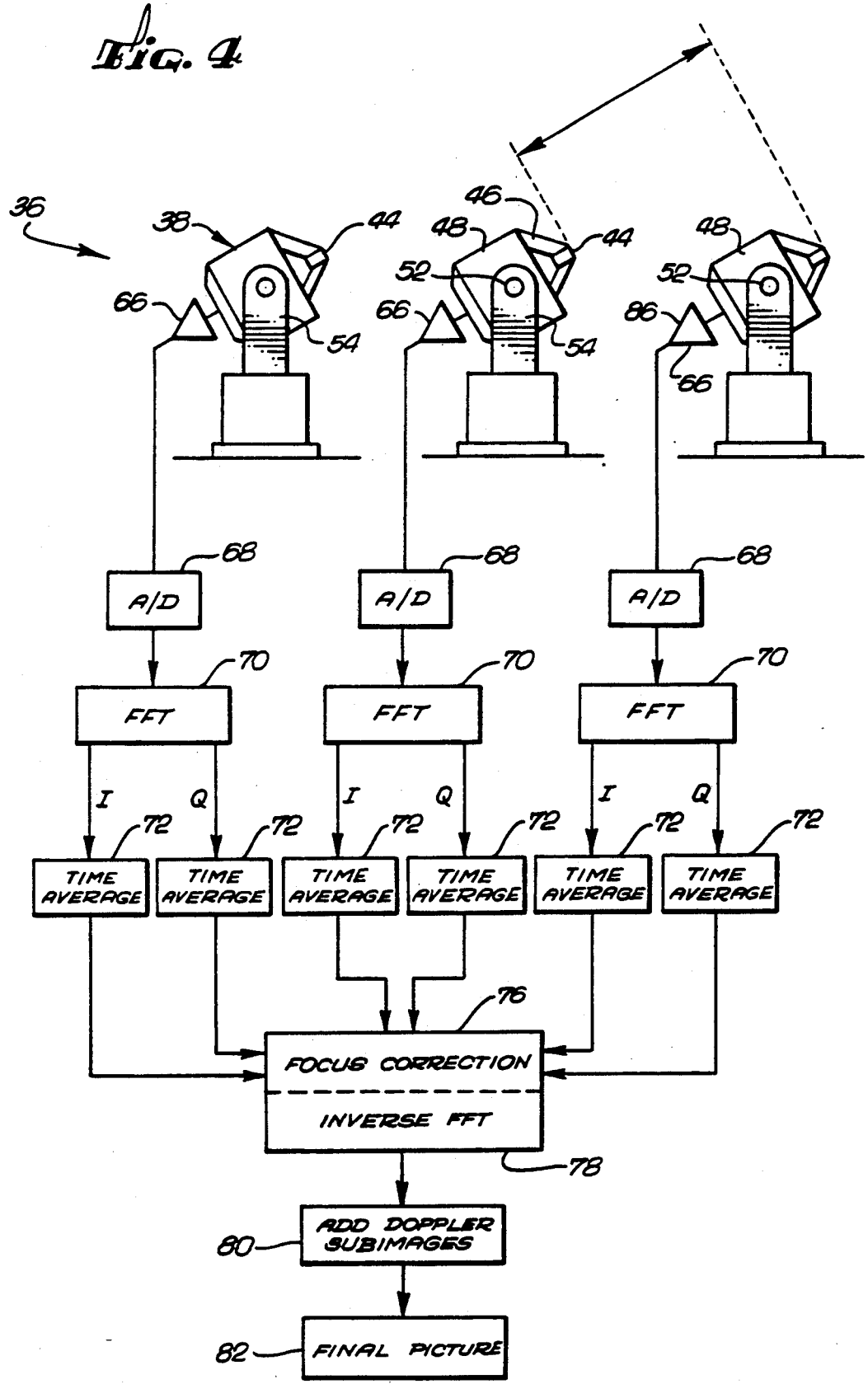

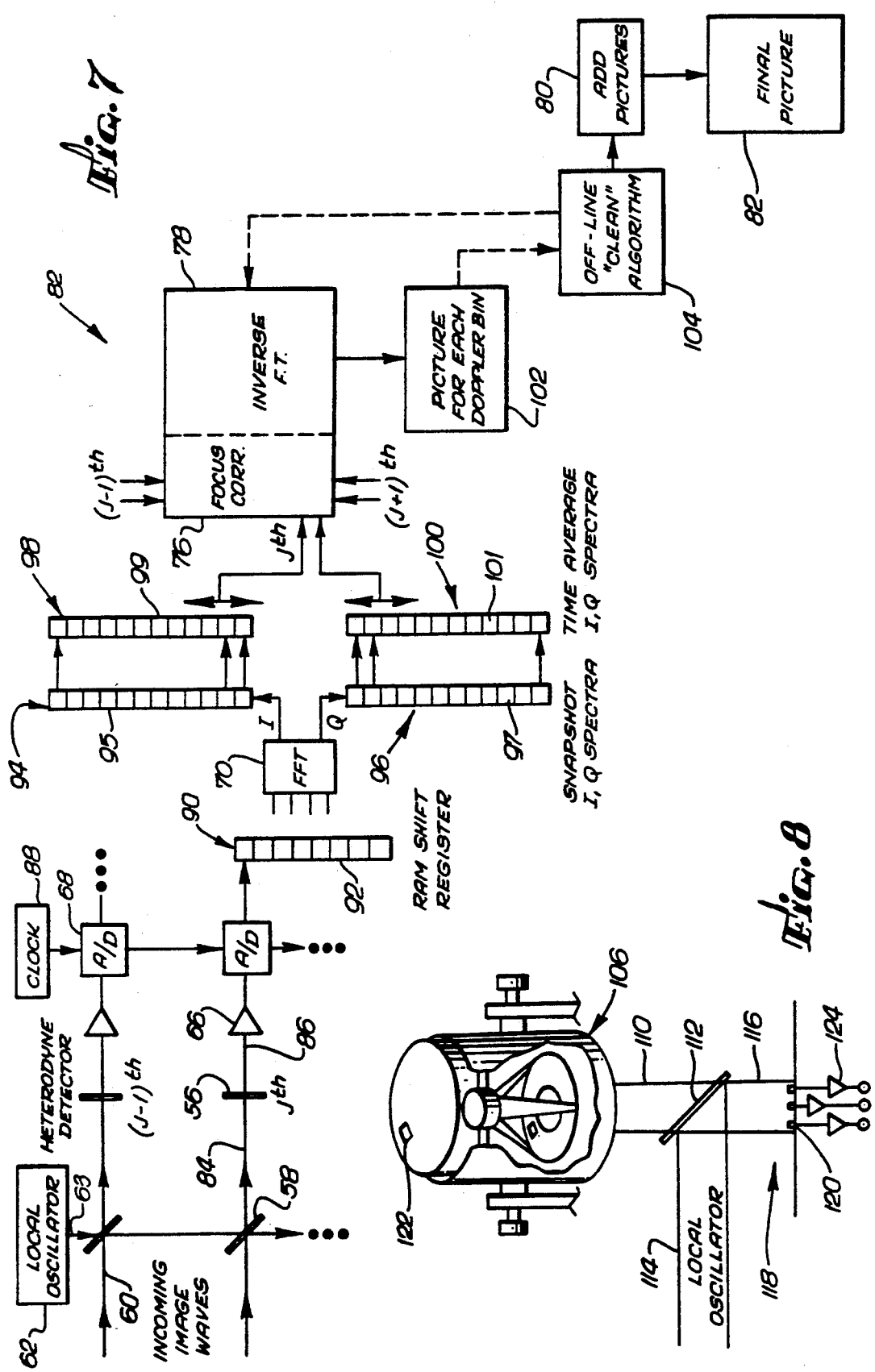

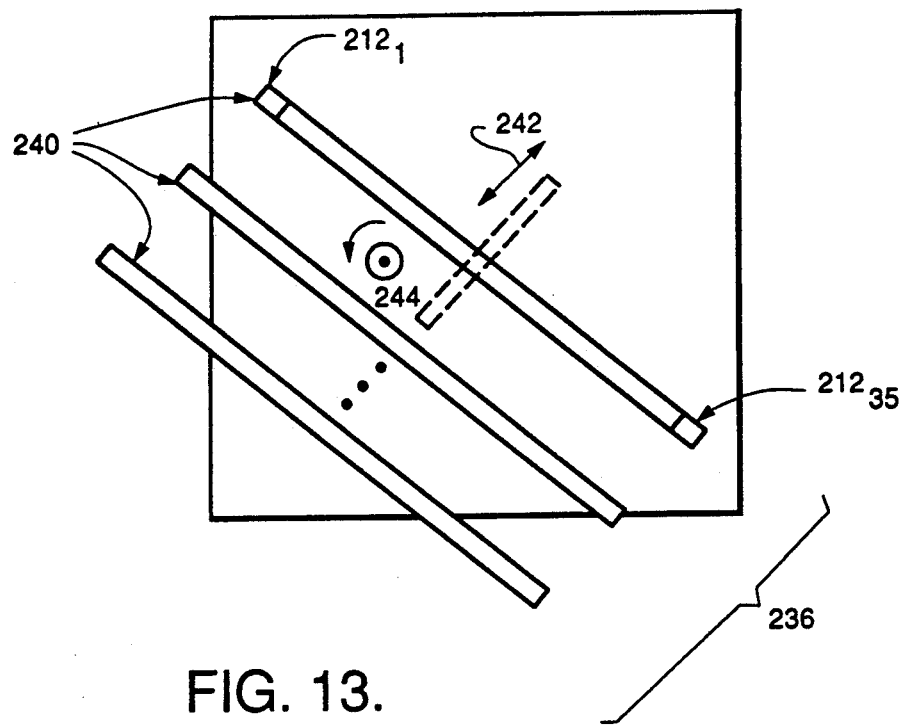
FIG. 13.
FIG. 15.
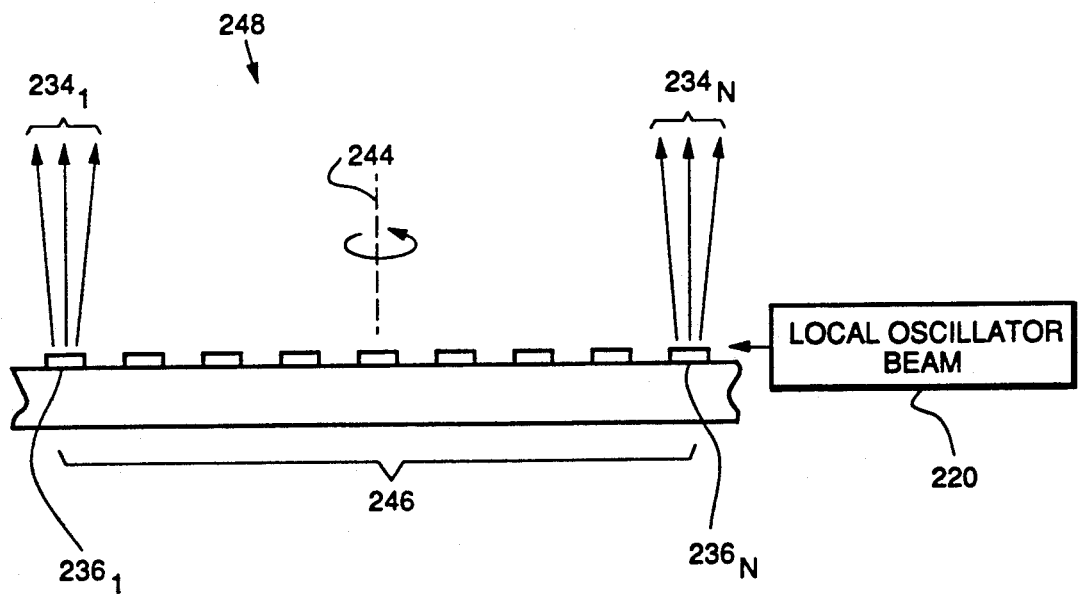

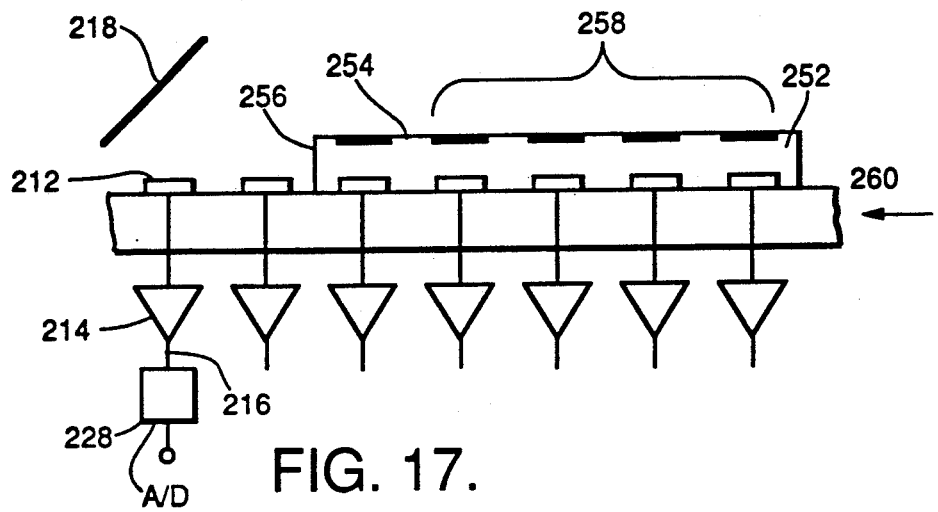
FIG. 17.

FIG. 19.
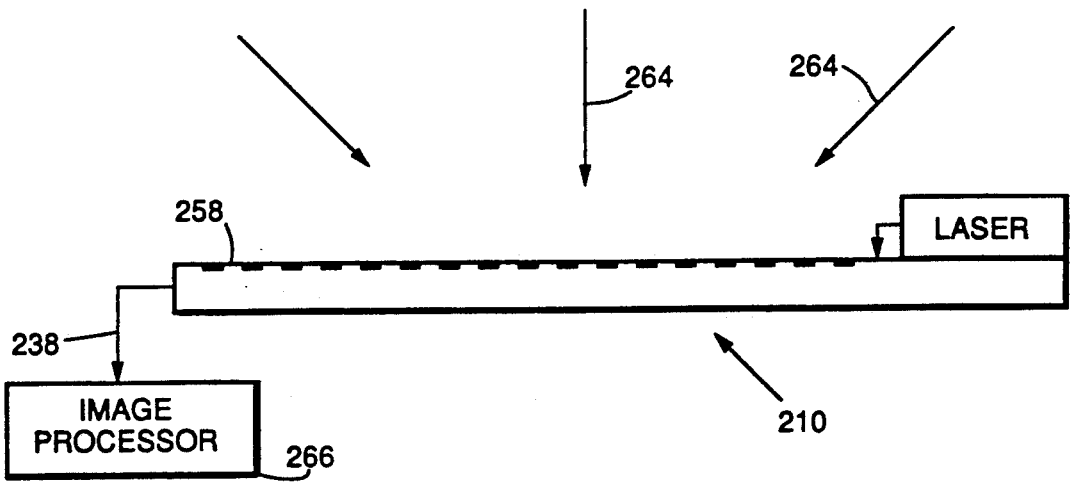

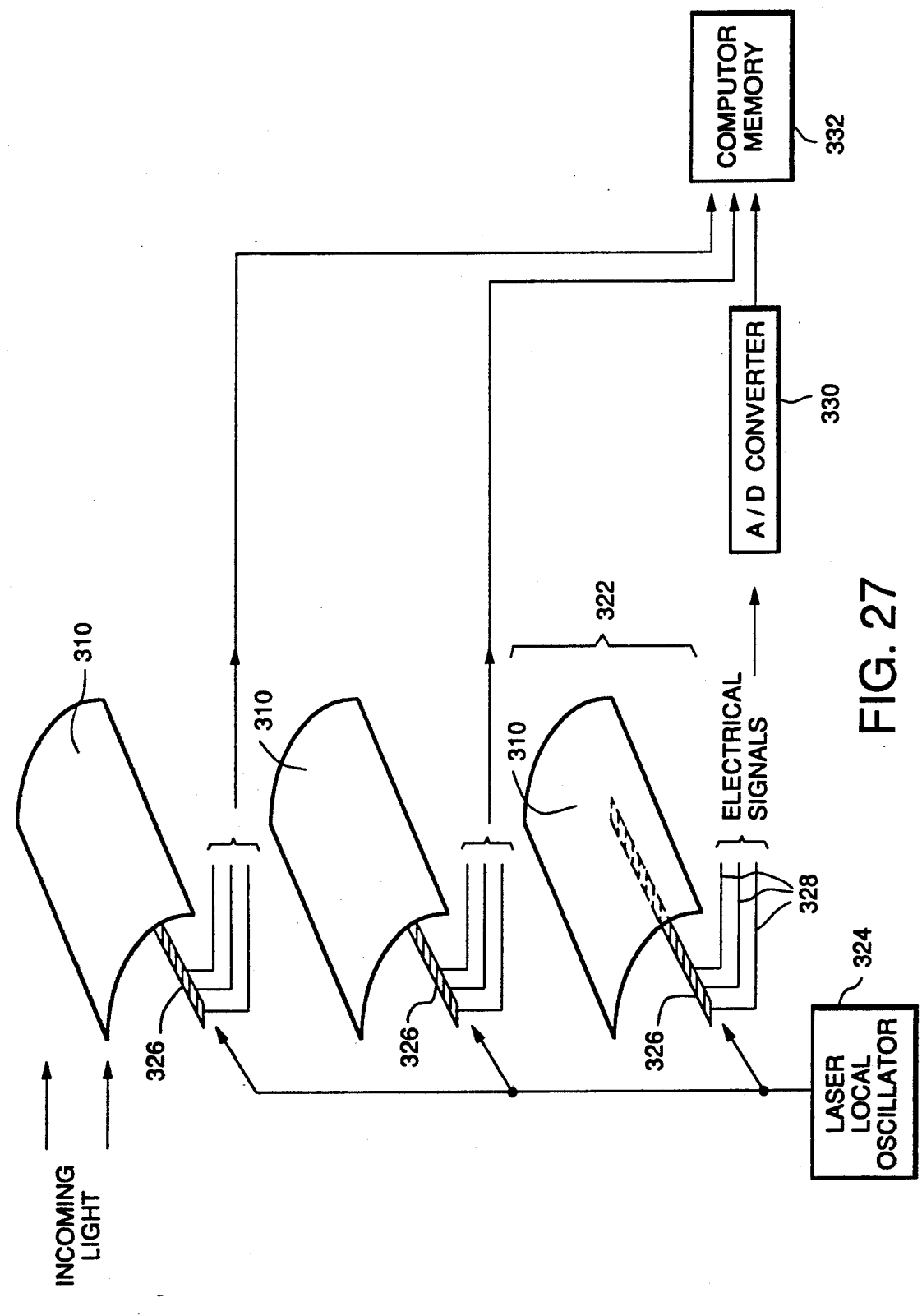

ELECTRONICALLY PHASED DETECTOR ARRAYS FOR OPTICAL IMAGING

BACKGROUND OF THE INVENTION

1. Reference to Related Applications

This is a continuation-in-part of co-pending Application Ser. No. 07/011,182, now abandoned, by James G. Small and Dennis R. Rossbach, entitled "Phased Array Imaging System," filed Feb. 5, 1987, and assigned to the assignee of the present invention. The present invention is also related to U.S. Pat. No. 4,724,439, entitled "Microwave Radiometer Using Fanbeam Inversion," by Carl A. Wiley and Charles R. Edelsohn, assigned to the assignee of the present invention.

2. Field of the Invention

This invention relates generally to optical imaging systems and more particularly has reference to an array of optical receivers useful for long range, high resolution imaging. The present invention further relates to electronically phased arrays and pluralities of arrays of optical detectors, and in particular to arrays or pluralities of arrays of heterodyne detectors used to record the amplitude and phase of arriving lightwaves for the purpose of electronically forming images.

3. Description of the Related Art

Telescopes have long been used to observe distant objects, but in order to do so with high resolution, they must have substantial magnifying power and a large aperture objective. Unfortunately, such large monolithic telescopes have a small field of view, and thus must be scanned, i.e., mechanically rotated or realigned, if wide field coverage is required. This is no simple task. The heavy pieces of optical glass or other large components present in these telescopes produce a substantial amount of mechanical inertia which must be overcome. Accordingly, these devices do not have the mechanical pointing agility needed for applications which require rapid retargeting across a wide field.

Phase coherent arrays of small aperture telescopes or subtelescopes are sometimes suggested as alternatives to a large monolithic telescope. In principle, the light collected by the subtelescopes can be combined to form a composite image having the same resolution as a single large aperture.

The array approach would have numerous advantages over the monolithic telescope. It would use smaller optics which would be much easier and less expensive to manufacture. It would achieve a substantial improvement in mechanical pointing and steering agility because the smaller and lighter subtelescopes would have a much lower mechanical inertia. The array could also synthesize collecting apertures which were much larger (and hence would have greater sensitivity and resolving power) than the several square meters which is the practical limit for a monolithic telescope. The modularity of an array of multiple identical subtelescopes would be more adaptable to meet specific needs. An array of numerous subtelescopes would also be relatively immune to performance degradation caused by a telescope failure.

Despite its potential advantages, the array approach has not yet been successfully applied to optical imaging systems. In the past, the advantages of phased telescope arrays have been offset by their need for a complicated and highly sensitive optical phase compensating path. The path includes numerous mirrors, wavefront sensors, moveable path length adjusters and related active servo controls capable of maintaining fractional wavelength accuracy. Absent phase compensation, the array cannot synthesize the resolving power of a single large aperture.

The known approach to an array includes optical heterodyne detectors placed at the focus or image plane of the system. That gives rise to additional limitations.

Because of the quantum mechanical nature of light photons, light waves can be detected only once. The light waves or images present at an optical focus or image plane, are the result of interference among the various separate light waves collected from different positions across the input aperture. Accordingly, a detector placed at a focus or image plane can only produce one image and that image will depict the condition of the light waves after they have been combined. The amplitude and phase information contained in the separate light waves from the various positions across the input aperture is lost.

The quality of the image produced at the focus or image plane is determined by the combined effects of the various optical paths traveled from object to image, including all intervening lenses and any atmospheric turbulence effects. If the image is blurred because of focus errors, aberrations in the telescope optical components, or aberrations in the optical paths, correction is difficult because the separate effects which produced the blurring cannot be determined.

A substantial body of prior art is devoted to the problem of deblurring images produced by intensity recording optical telescopes. The field is generally known as Speckle Interferometry. In these approaches, narrow bandwidth filters and short time exposures are used to produce intensity recordings of the blurred and speckled images in the focal plane of the telescope. The recordings are then processed by iterative computer algorithms or frame-by-frame time averaging techniques to recover estimates of the undistorted amplitudes and phases of the incoming waves. The results are not always satisfactory.

In radio astronomy, it is common practice to detect and record the amplitude and phase of separate radio waves before they are combined and to use electronic signal processing to perform the combination after detection. However, these practices have never been successfully extended to the optical wavelengths or to optical imaging systems. Moreover, they are based on complicated data processing schemes which involve massive amounts of data and numerous cross correlation processors.

A microwave imaging system capable of high resolution from long distances and over a wide field of view is described in U.S. Pat. No. 4,724,439, entitled "Microwave Radiometer Using Fanbeam Inversion," by Carl A. Wiley and Charles R. Edelsohn. U.S. Pat. No. 4,724,439 is assigned to the assignee of the present invention and is hereby incorporated by reference herein. The system described includes a line-source or other fanbeam antenna for receiving microwave radiation along fanbeams, and a means of rotating the fanbeams relative to the earth. A sensor tracks the orientation of the fanbeams and provisions are made for reconstructing the image from data furnished by the antenna and the orientation sensor. It would be a great advance in the art if some of the microwave techniques described in the application referred to could be extended to optical and infrared wavelengths using photodetectors.

Detector arrays in conventional imaging systems require the closest possible spacing between detector elements. Close spacing insures that no resolvable feature of the image will be lost in dead spaces or gaps between detector elements. Close spacing of detector elements is no simple task when high-resolution images are detected with two-dimensional arrays of detectors. In general, each detector element must be closely coupled to a low-noise preamplifier. The problem is particularly acute when high-speed response is required. High-speed performance requires very short and careful arrangement of signal lines between each detector and its associated amplifier. In close packed arrays, there is little room to run signal lines from each detector element to a multiplicity of amplifiers, and it is usually impossible to keep the lines sufficiently short to achieve radio- or microwave-frequency response times. It would be an advance in the art of optical and infrared imaging systems if it were possible to use a detector element arrangement in which the detector elements are spaced apart sufficiently to obviate the problems discussed above.

At present no imaging system is capable of rapidly retargeting an optical beam through a large two-dimensional field of view while maintaining the pointing accuracy of a large-aperture telescope. On a typical radar, both transmitted beams and the receiver field of view must be steered in a coordinated fashion.

The present technology of beam steering at optical and infrared frequencies centers around a few classes of physical devices: 1) mechanically scanned telescopes, mirrors, prisms, and diffraction gratings; 2) acousto-optic beam deflectors; 3) electro-optic phase shifting devices; 4) liquid crystal light valves; and 5) various "writable diffraction grating" concepts such as photo-induced gratings. Beam steering systems using the devices listed above suffer from deficiencies in one or more of the following categories: scan speed or retargeting capability (particularly items 1) and 4)); total field of view (all of the above items); and image resolution (all but large telescopes under item 1).

Consider the telescope of magnification M shown in schematic form in FIG. 9. If a telescope with magnification M is used to image off-axis targets in target space, the angle between light beams from two different targets is multiplied at the detector plane in image space. Thus, in FIG. 9 angle $a_2$ equals M times angle $a_1$. Suppose a telescope field of view of 20 degrees by 20 degrees is desired. If the telescope magnification is 10, the image plane must span 200 degrees by 200 degrees, which is not practical because it is greater than a hemisphere. Even if all aberrations could be eliminated, a large field of view is not compatible with large magnification. The big advantage of magnification is to increase the receiving capture area for each detector element, but at the same time it also increases angular beam spread in image space.

If the problems encountered in developing rapid and precise steering of optical and infrared beams as described above could be eliminated, a major constraint on the development of high-performance laser radars and imaging systems could be removed.

Optical heterodyne detectors which use laser light as a local-oscillator wave are fully capable of detecting and imaging white-light illuminated scenes. Such heterodyne detection of incoherent sources is commonly referred to as "heterodyne radiometry". Imaging heterodyne radiometry is routinely practiced by radio astronomers at microwave frequencies. Heterodyne radiometry of incoherently illuminated scenes suffers from one principal disadvantage compared to conventional detection schemes. The light emitted by an incoherent scene contains a continuous distribution of many wavelengths or frequencies. A heterodyne radiometer can detect only a relatively small bandwidth of those light frequencies, namely only frequencies which can be heterodyned to fall within the passband of the electronic circuits which follow the optical detector element. While a relatively small bandwidth may be adequate for many purposes, such as radio astronomy, the heterodyne radiometer typically has greatly reduced sensitivity to faint scenes as compared to a direct detection imaging system. It would be a great advance in the art of optical heterodyne radiometry if a way could be found to significantly increase the sensitivity of light detection using this technique.

SUMMARY OF THE INVENTION

The present invention overcomes the problems which exist in the prior approaches to an optical phased array.

Unlike conventional optical systems, the present invention provides a phased receiver array which manipulates electrical signals rather that optical waves or photons to produce an image. Optical elements are used to collect light from object space but not to form images thereof. Electrical signals are derived from a novel configuration of electro-optical heterodyne detector elements associated with an array of subtelescopes. The beam combining and interfering functions needed for image formation are performed simultaneously for the many different path lengths after detection by the use of novel electronic processing. The necessary phase corrections are inferred directly from the electrical signals without the need for complicated optical phase compensating components. The resulting simplifications in construction and operation make the phased telescope receiving array practical for the first time.

Unlike optical prior art, but as an extension of the concepts of radio astronomy, the present invention places the heterodyne detector arrays near a pupil plane of the imaging system, rather than at a focal plane of the system. The arrays thus detect and record the amplitude, phase and polarization of the separately arriving light waves before they combine into an image. By comparison, a conventional optical imaging system records the intensity of collected light waves only after the image is formed. Accordingly, the present invention records substantially more information than conventional optical systems and produces what is essentially an electronic holographic recording. New and flexible hardware designs, image processing and performance capabilities are thus available.

An optical imaging system incorporating features of the present invention includes a two dimensional planar array of subtelescopes which direct their respective light waves onto heterodyne detectors or arrays of detectors associated with each subtelescope. A laser source and optical fiber guides provide a commonly derived local oscillator wavefront for each detector. The electrical output signals from the detectors contain both amplitude and relative phase information for the optical wavefronts received by the array. This information is used for sophisticated signal processing. Novel electronic signal processing is used to produce a phase coherent combination of the electronic signals from the various detectors. A fast Fourier transform (FFT) operation produces amplitude and phase records of the input optical wavefronts. The records between each pair of adjacent subtelescopes constitute point samples in a holographic recording. An inverse transformation coherently combines the input wavefronts and recovers the scene under observation by the array. The number of resolvable pixels in the scene will increase with the number and spacing of the subtelescopes in the array.

By recording the amplitude and phase of the separately arriving light waves, instead of merely recording the intensity of a combined image, the present invention has new performance capabilities.

As discussed above, a major limitation of a system which records the light waves only after they have been combined into an image is that it gets only one chance at the incoming wavefront. It produces only one image, and that image will depict the actual condition of the scene as reproduced by the imaging system. If a blurred image is produced as the result of intervening atmospheric turbulence, distorting media such as imperfect telescopic optics, movement of the object being imaged, or movement of the receiver, correction is difficult.

By recording the amplitude and phase of the separately arriving light waves in the vicinity of pupil conjugate surface, the present invention can perform parallel processing functions, i.e.. it can process the same incoming data in different and simultaneous algorithms to produce multiple and varied images of the same scene. If a blurred image is obtained, the same incoming data can be reprocessed with different amplitude and phase weighting functions in pupil conjugate surface to reduce the blur. For example, depth of focus can be adjusted after the signals have been recorded. Similarly, an aberrated telescope can be electronically corrected to produce diffraction limited images.

The ability of the present invention to image through a turbulent atmosphere is particularly significant. Atmospheric turbulence produces time varying aberrations which can be electronically corrected. When the telescope aperture is smaller than the transverse dephasing length of the atmosphere, turbulence will produce simple piston phase errors at each subtelescope. The electronic processor compensates for these phase errors by using integration times which are faster than the atmospheric changes to effectively "freeze" the atmosphere. The "frozen" phase and amplitude measurements at each subtelescope are separately time averaged to effect compensation. This technique relies on the phase measuring properties of coherent arrays and is not possible with intensity based receivers such as speckle interferometers. The time averaging operation also performs noise suppression and data compression functions.

The telescope array of the present invention will image coherently (i.e. laser) illuminated objects or naturally illuminated objects such as stars and planets. It will image stationary objects and, when used in conjunction with a narrow bandwidth or coherent illuminating source, can record and display the total and differential Doppler shifts needed to image moving objects. When used with a pulsed source, range information is also available. The signal processing concepts of the invention are also applicable to arrays of microwave radiation receivers used in, for example, radars and radio telescopes.

Electronic signal processing can also synthesize very large aperture optical receivers without accurately placing and holding the optical components to high tolerance interferometric accuracy.

Objects of the invention are, therefore, to provide an improved optical imaging system and to provide an optical imaging system utilizing a phased array of optical receivers.

Another object of the invention is to provide a phase coherent array of optical telescopes which does not require optical beam combiners and interferometers or optical path length controlling components, such as beam steering mirrors, piston phase shifters and wavefront sensors, to produce images.

Still another object of the invention is to provide a synthetic aperture optical receiver of very high magnification and resolution which does not require large optical components or high manufacturing tolerances. Specifically, it is an object of the invention to combine a large number of small subtelescopes to form a large and phase coherent collecting aperture which has high sensitivity and high resolving power.

Still another object of the invention is to provide an optical phased array including a plurality of subtelescopes each of which is provided with a heterodyne detector or array of detectors.

A further object of the invention is to provide a telescope array capable of imaging coherently illuminated objects and naturally illuminated objects.

Yet another object of the invention is to provide a telescope array cabable of imaging both stationary and moving objects. A further object of the invention is to provide an optical receiving and imaging system which produces high resolution images of space objects from ground based observations, or visa versa, through a turbulent but otherwise transparent atmosphere. Specifically, it is an object of the invention to provide an optical system which compensates for phase distortion caused by atmospheric turbulence.

Still another object of the invention is to provide an optical imaging system which detects and records the amplitude and phase of separately arriving light waves in the vicinity of pupil conjugate surface before they are combined into an image at an image plane.

Yet another object of the invention is to provide an optical imaging system which manipulates electrical signals rather than optical waves or photons to produce images.

Still further objects of the invention are to provide an optical imaging system which is capable of detecting weak target signals, which has high pointing accuracy, and which can reconstruct an image of a scene under observation.

Yet another object of the invention is to provide a single large aperture telescope having an array of heterodyne detector elements located substantially near a pupil conjugate surface.

Still another object of the invention is to provide an optical imaging system which is capable of producing Doppler images of objects having no spatial resolution.

A further object of the invention is to provide an improved data processing technique for a phase coherent receiver array.

Still another object of the invention is to provide a data processing technique for a phase coherent array which includes an averaging operation that compensates for time varying random phase errors and performs noise suppression and data compression functions.

Additional aspects of the present invention obviate the problems described above in the latter part of "Description of the Related Art." In a first additional embodiment, passive microwave radiometry is extended to infrared and visible wavelengths utilizing fanbeam concepts. A second additional embodiment employs optical heterodyne detectors spaced sufficiently far apart that high-speed amplifiers and signal processing components can be placed adjacent to the detector elements. In a third additional embodiment the local oscillator signals are introduced to the optical heterodyne detectors via a thin-film guided-wave beamsplitting means. A fourth additional embodiment functions as an imaging telescope: a multiplicity of optical heterodyne detectors are supplied with a reference beam by an integral guided-wave beamsplitter without additional conventional optical elements of any kind. Variations of this imaging telescope embodiment include employment of the optical heterodyne detectors in nonflat and conformal arrangements. A fifth additional embodiment of the invention combines a linear array of optical heterodyne detectors with one-dimensional focusing optical elements such as cylindrical lenses or reflectors. In a sixth additional embodiment a plurality of local oscillator frequencies is used to increase the capture bandwidth and sensitivity of infrared and visible heterodyne detector arrays.

The first additional embodiment utilizes a rotating linear array of detector elements which stares at an entire field of view all the time, a concept for which the word SPINNOR has been coined (a contraction of "spinning optical radar"). A wide field of view is achieved without mechanical motions by a linear array of discrete detectors and beamsplitters. Each detector has a different line of sight due to tilting of individual beamsplitters, and the result is a staring array which looks simultaneously in many directions to produce a fanbeam. A variation on this embodiment comprises a collection of detector fanbeam arrays arranged in parallel, defined as a "detector group," which can be used to span a two-dimensional field of view. Each fanbeam measures a spatial Fourier component of the image within the field of view along a direction perpendicular to the fan. Rotation of the detector group through all possible angles will yield all Fourier components of the scene being viewed, and the real image can be reconstructed by inverse transformation of these components.

The resolution limit of a fanbeam array consisting of one detector group is the width of the fan. Much higher resolution can be obtained from the coherent interference of the outputs of multiple detector groups. If a long linear array of detector groups is rotated through 180 degrees about an axis along the line of sight, the reconstructed image can have the resolution of a telescope with a circular aperture equal to the largest spacing between two detector groups.

Rapid and precise pointing and tracking is accomplished by electronic processing of the detector outputs in parallel. The resolution of a large-aperture telescope is synthesized. Fields of view wider than 100 degrees by 100 degrees are possible while maintaining an effective resolving aperture many meters in diameter. SPINNOR can replace mechanical beam-steering mirrors and electro- and acousto-optic beam deflection devices in many applications, and can be applied to passive imaging systems and to both monostatic and bistatic (transmitter and receiver on separate platforms) radars. In orbital surveillance of the earth one SPINNOR could replace a large number (10 to 100) of conventional orbital imaging systems, such as scanning telescopes, with an orbital mass less than the mass of one telescope. There is a potential for domination of space-based infrared imaging as well as applications to ground-based infrared telescopes.

The second additional embodiment of the invention reduces the requirement for close packing in optical imaging systems by placing the detector elements in a plane which is conjugate to the entrance aperture. Images are formed by electronic processing of the detector signals and not by a spatial mapping of the light into regions of a focal plane. Each resolvable feature of the object being imaged contributes light to each of the detector elements. Allowing spaces between the detector elements does not result in the loss of any resolvable features. Nonclosepacked detector arrays constitute a "thinned aperture" imaging system with well known and controllable sidelobe properties. Very high-speed amplifiers may be placed immediately adjacent to each detector element, thereby permitting very high-speed imaging receivers, such as are required to detect high-speed Doppler information from a scene. Additional signal processing circuitry may be placed adjacent to the high-speed amplifiers. The early stages of pupil-plane signal processing (described below) involve Fourier transform frequency analysis and time integration. Following these processing steps, the data rate is substantially reduced. The very high-speed processing steps that are required may be performed by special-purpose integrated circuits which may be placed directly on the detector plane array. The resulting low-bandwidth, partially processed signals may then be transmitted to the remaining signal processing stages over conveniently low-bandwidth signal lines.

In the fourth additional embodiment of the invention a coherent telescope with unity magnification and no focusing optics comprises an array of coherent heterodyne detectors. The line of sight of the telescope is steered by steering the angle of arrival of the local oscillator beam; the detectors produce coherent output beats for arriving waves which are spatially coherent with the local oscillator beam. For this type of telescope beam, steering agility in the receiving mode can be achieved by steering of the local oscillator beam or by tilting (mechanical or otherwise) of beamsplitters. For waves slightly off the line of sight but within the diffraction field of a single detector, direction can be computed from phase differences in the preamplifier outputs from the multiple detectors. Laser illuminated targets are suitable objects for viewing by this apparatus.

In the fifth additional embodiment of electronically phased arrays in accordance with the invention, a cylindrical lens or curved mirror serves to collect light from a large area and produce a line focus representing a one-dimensional spatial Fourier transformation of the incoming waves. An extended scene appears as a series of light and dark streaks or bands on the focal plane, which is provided with a linear array of heterodyne detector elements. A local oscillator laser source is provided to each detector by means of a discrete beamsplitter element or a guided-wave beamsplitter. The resulting electrical signals from each detector element are recorded and computer processed to form an image. The computer processing of the recorded signals needs only to perform an additional one-dimensional Fourier transformation to obtain an image. If a one-dimensional telescope is moved or rotated relative to the scene under observation, rows of bright and dark bands will scan across the linear detector array and rapid repetitive electronic scanning of the heterodyne detector array can sequentially build up a two-dimensional picture row-by-row.

The one-dimensional focusing of this fifth additional embodiment has the following advantages: 1) A linear array of heterodyne detectors is simpler to fabricate than a two-dimensional array and the signal processing steps are substantially simpler. The number of heterodyne detector elements required to form a high-resolution image is greatly reduced. 2) A one-dimensional electronic telescope may be fabricated with much larger aperture and higher resolution than conventional telescopes. Cylindrical optical elements are easier to fabricate and less expensive than conventional two-dimensional focusing optical systems, particularly for very large apertures. 3) One-dimensional focused telescopes are well suited to phased arrays of discrete and spatially separated telescopes; they need not be rigidly held to optical tolerances to achieve large-aperture performance, in contrast to conventional optically combined telescope arrays.

In the sixth additional embodiment of the invention a plurality of local oscillator frequencies is used to increase the capture bandwidth and sensitivity of infrared-and visible-wavelength optical heterodyne detector arrays. Optical heterodyne detectors which use laser light as a local-oscillator wave are capable of detecting and imaging white-light illuminated scenes in a technique known as "heterodyne radiometry". Heterodyne radiometry of incoherently illuminated scenes using conventional detection schemes detects only a relatively small bandwidth of the light frequencies in the continuous emitted distribution, namely only frequencies which can be heterodyned to fall within the passband of the electronic circuits which follow the optical detector element. The optical phased arrays described above can be made much more sensitive than conventional heterodyne radiometers by a novel application of multiple local-oscillator frequencies described in more detail below.

The various features and advantages of the present invention will become apparent in light of the following detailed description taken together with the accompanying drawings, in which:

BRIEF DESCRIPTION OF THE DRAWINGS

FIG. 3 is a schematic optical layout of a phased array telescope receiver embodying features of the present invention;

FIG. 4 is a schematic functional block diagram of a signal processing method useful in the present invention.;

FIG. 7 is a schematic diagram of a digital signal processor useful with the present invention;

FIG. 8 is a schematic view of an alternative phased array telescope receiver embodying features of the present invention;

FIG. 13 is a schematic diagram showing how multiple fanbeams can map an entire two-dimensional field of view;

FIG. 15 is a schematic diagram showing how very high-resolution fans can be synthesized by coherent processing of the output signals from N detector groups, with a 180° rotation yielding a resolution equivalent to a telescope having a circular aperture D;

FIG. 17 is a schematic diagram of a linear array of optical heterodyne detectors with a guided-wave local oscillator arrangement;

FIG. 19 is a schematic diagram of a heterodyne phased receiver array connected to an image processor;

FIG. 27 is a schematic diagram of an array of one-dimensional telescopes utilizing cylindrical mirrors.

DETAILED DESCRIPTION OF THE INVENTION

Figures 1, 2:
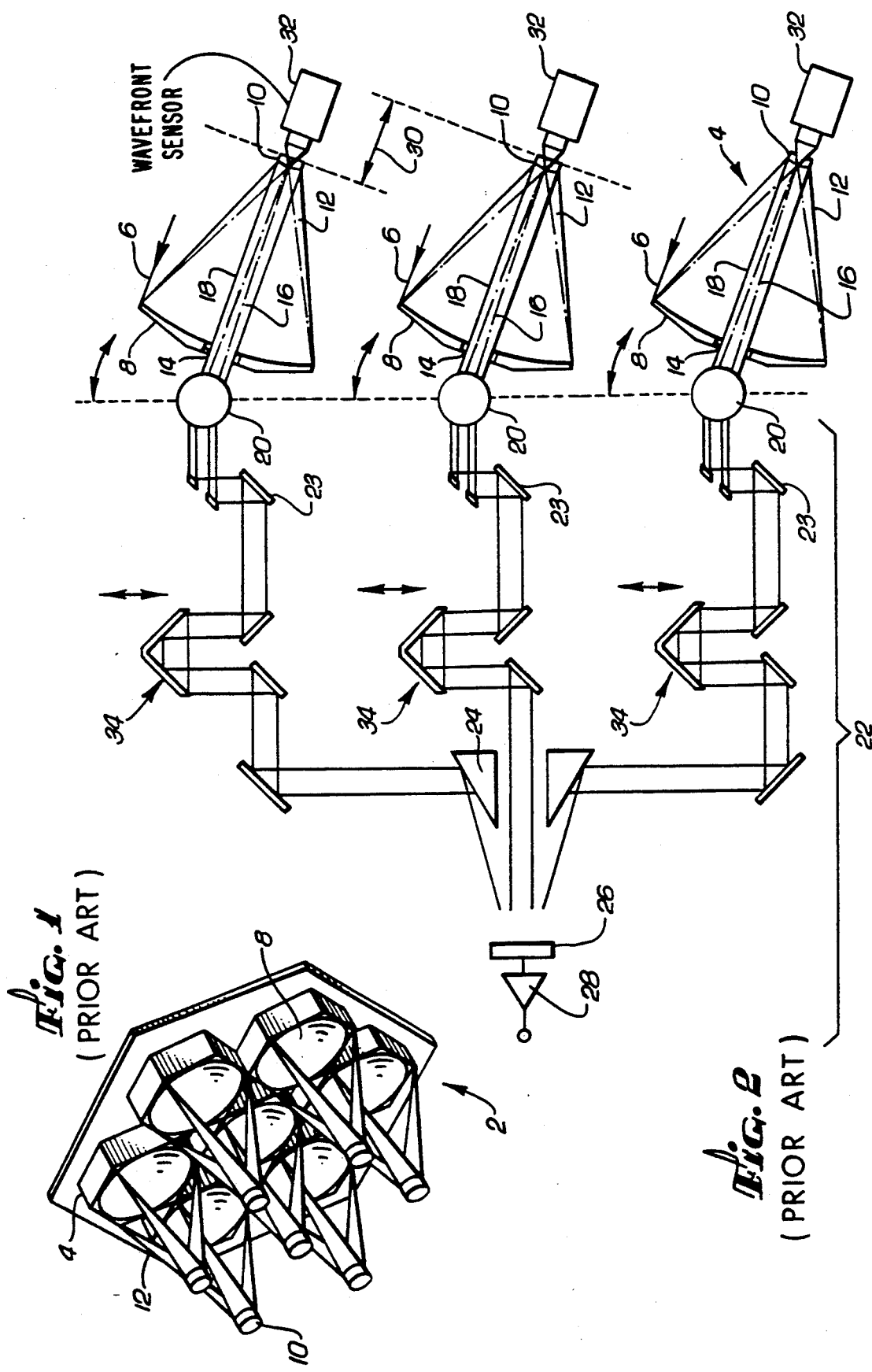
FIG. 1 is a perspective view of a telescope array.
FIG. 2 is a schematic optical layout of a telescope array including beam combining paths with piston control.

FIGS. 1 and 2 illustrate the conventional conceptual approach to a phase coherent array of optical telescopes.

FIG. 1 shows a typical array 2 formed by a plurality of adjacent subtelescopes 4. The number of subtelescopes and the specific pattern of arrangement can be varied from that shown to suit particular needs.

For ease of explanation, FIG. 2 shows three subtelescopes 4 arranged in a linear pattern. Each subtelescope 4 is separately mounted for pivotal movement on its own gimbal 20.

The subtelescopes 4 are similar to conventional afocal reflecting Cassegrain telescopes. The incoming collimated light 6 from distant objects impinges upon a curved primary mirror 8 where it is reflected toward a secondary mirror 10. The secondary mirror 10 is mounted on converging support arms 12 which extend forward from the primary mirror 8. The secondary mirror 10 collimates the light and reflects it through an opening 14 in the center of the primary mirror 8. A void 16 exists in the center of the collimated beam 18 as a result of obscuration caused by the secondary mirror 10.

The collimated beams 18 emanating from the openings 14 in the various subtelescopes 4 enter respective branches of a beam combining pathway 22. There, appropriate beam steering mirrors 23 and reflectors 24 combine the light from the separate subtelescopes 4 into a single wavefront which is directed onto a single image plane detector or detector array 26 located at the exit aperture of the system. The electrical signals produced by the detector 26 in response to the incident wavefront are passed through an amplifier 28 and then into conventional data processing circuitry (not shown) for the purpose of reconstructing an image of the scene viewed by the array 2.

For the array 2 to achieve a diffraction limited resolution equivalent to a single large aperture, the beams from the separate subtelescopes must be coherently combined. This requires that the various beams travel interferometerically equal path lengths as they progress through their respective subtelescopes 4 to the detector array 26. Such beams will optically interfere in phase to produce a single coherent wavefront at the exit aperture of the system. Path length accuracy to a fraction of a wavelength is required.

If the subtelescopes 4 are steered in a Venetian blind fashion as shown in FIG. 2, a path length mismatch will occur when the array 2 is pointed away from its symmetry axis. An incoming wavefront will encounter a substantial difference in arrival time at successive subapertures and will thus produce a path length mismatch known as "piston error" 30.

Compensation for piston error or "piston control" is typically achieved by providing optical trombone phase matching lines in the branches of the beam combining pathway 22. A wavefront sensor 32, typically accurate to a fraction of a wavelength, is positioned on the end of each subtelescope 4 for independently measuring the various piston errors 30 between adjacent subtelescopes 4. The outputs of the sensors 32 are input into an active mechanical servo system (not shown) which operates actuators (not shown) that control the movement of optical trombone piston phase shifters 34 located in each of the branches of the pathway 22. The pistons 34 are path length adjusters which move laterally to change the effective path length of the branches. The path lengths between each subtelescope 4 and the detector array 26 are adjusted to negate the mismatch caused by the piston error.

Additional servo controls (not shown) compensate for effective transverse spacing changes between subtelescopes 4 to maintain the Shannon Condition when the array 2 is steered.

The complicated arrangement of beam steering mirrors 23, piston phase shifters 34, wavefront sensors 32 and related servo controllers and actuators usually outweighs the advantages of conventionally conceived phased telescopes arrays.

FIG. 3 illustrates a heterodyne telescope receiving array 36 made in accordance with the present invention. Three subtelescopes 38 in a linear array are shown for ease of explanation, but it is understood that the number of subtelescopes 38 and their pattern of arrangement can be varied from that shown without departing from the invention. A preferred array 36 has anywhere from two to about one hundred subtelescopes 38 arranged in a Gaussian random array. The random array uniformly distributes the diffraction sidelobes as background noise and thus prevents the amibiguity cells or multiple images which can be produced by sidelobes in an ordered array.

Each of the illustrated subtelescopes 38 has the general configuration of a focal reflecting Cassegrain telescope. Thus, each of the subtelescopes samples a portion of the pupil plane of the array. Specifically, the incoming collimated light 40 from distant objects impinges upon a curved primary mirror 42 where it is reflected toward a secondary mirror 44. The secondary mirror 44 is mounted atop converging support arms 46 which extends forwardly of the telescope housing 48. The secondary mirror 44 focuses the light on an opening 50 in the center of the primary mirror 42. Although Cassegrain subtelescopes are shown, it is understood that any type of focal or afocal subtelescope can be used. Subtelescopes having an aperture size of about 20cm. to about −1m. are preferred.

Each subtelescope 38 is pivotally mounted on its own gimbal 52 located atop a pedestal 54. The pivotal movement allows the subtelescopes 38 to be mechanically steered or scanned across a wide field of view. The subtelescopes 38 are preferably arranged to look in parallel.

Each subtelescope 38 is provided with an optical heterodyne detector or array of detectors 56 and a beam splitter 58 located in the path of the signal beam 60. In the Cassegrain type subtelescope 38, the beam splitter 58 is interposed between the detector 56 and the secondary mirror 44.

A local oscillator beam 63 derived from a common laser source 62 is conducted to the respective subtelescopes 38 by arbitrary lengths of flexible optical fibers 64. The fibers 64 are connected to the subtelescope housings 48 and terminate in conventional beam expanding lens systems (not shown) which direct the local oscillator beam 63 toward the respective beam splitters 58. The beam splitters 58 combine the local oscillator beam 63 with the signal beams 60 to produce heterodyne beat signals which are observed by the detectors 56. The electrical output signals produced by the detectors 56 in response to the beat signals are communicated to a digital signal processor (not shown) via RF signal amplifiers 66. Although the detectors 56 are shown in FIG. 3 as being located at the focus of the subtelescopes 38, it is understood that they can be located elsewhere. The effective entrance aperture of the imaging system is defined by the array 36 of subtelescopes 38 taken as a whole and not by individual subtelescopes 38. The subtelescopes 38 reimage the entrance aperture into a plurality of pupil conjugate surfaces. Detectors which are located substantially near these pupil conjugate surfaces will perform the desired function, e.g., sample portions of the pupil conjugate surface, without regard to the particular relationship between the detectors 56 and the individual subtelescopes 38. The only limitation is that the local oscillator beam 63 must be compatible with the way in which the detectors 56 will receive light collected by the respective subtelescopes 38.

More specifically, it is preferred that the detectors 56 be located within the order of the classical depth of focus of the aperture conjugate surface. For example, in a system having an f number greater than 1, the depth of focus D is defined as:

$$D = \pm 2\lambda f^2/n$$

where $\lambda$ is the wavelength, f is the focal length and n is the index of refraction. However, it is appreciated that the location of the detectors may be varied by as much as about four times the depth of focus and still perform the desired function.

The electrical signals produced by the detectors 56 are electronically processed in a novel manner to synthesize a phased coherent telescope array.

Before discussing the details of a suitable signal processor, it will be helpful to describe the nature of the signals produced by the detectors 56 and to set out an overview of the functions to be performed by the processor in order to produce an image.

The optical heterodyne process at each detector 56 produces a sinusoidal electrical signal whose beat frequency, amplitude, and phase are linear samples of the optical wave at one position of entrance aperture of the system. For a moving target which produces moving speckle and Doppler shifts, the electrical signal is a composite of many frequencies beating together, i.e. a Doppler spectrum, defined as follows:

$$V_{xy}(t) = \sum_i A_i \cos[w_i t + \phi(x,y)]$$

Most of the image information is contained in the "$\phi(x,y)$" term.

There are two sources of phase error in the above signal which must be detected and compensated by the signal processor. The first, illustrated in FIG. 3, is piston error 68 due to telescope pointing. The optical path differences attributable to this type of error can be up to a meter or more and may represent $10^6$ wavelengths of phase difference. The second source of phase error comes from thermal or mechanical changes in the optical fibers 64 and from differences in the path lengths between the local oscillator beam 63 and each detector 56. These latter phase errors amount to a few wavelengths of phase difference.

To compensate for the phase errors and to form a phase coherent image of the target, the electrical signals are first time sampled, digitized, and recorded. Simple digital algorithms are used to extract amplitude, frequency, and phase noise. Local oscillator phase biases across the array 36 are subtracted from the recorded phases by referring to a calibration look up table. An image is formed by a simple two dimensional fast Fourier transformation (FFT) of the amplitudes and corrected phases. The FFT operation performs the function of an image focusing lens. The effective focal distance of the telescope array 36 is adjusted by making phase corrections to each recorded signal.

FIG. 4 illustrates additional details of the novel signal processing method of the present invention.

Figure 5A:
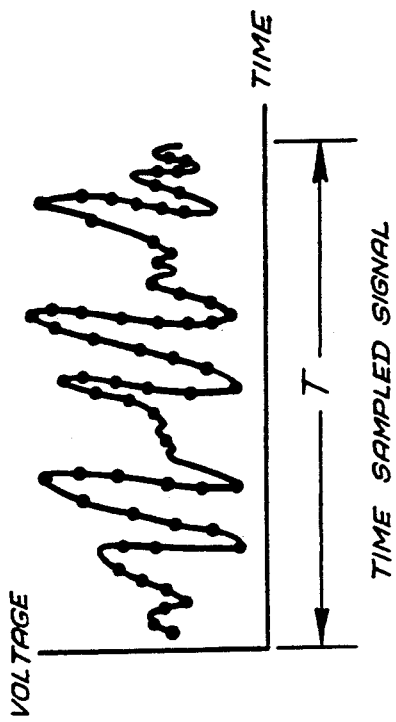
FIGS. 5a and 5b are graphical representations of, respectively, a time domain sample and the Doppler spectra thereof, for a signal produced by heterodyne detectors used in accordance with the present invention.

The electrical signals from the amplifiers 66 associated with each of the subtelescopes 38 are converted to a digital data stream by anolog-to-digital (A/D) converters 68. Typical digitizing rates can be as fast as 1 GHz or as slow as 1 MHz. In general, the signals must be digitized sufficiently fast to resolve any target Doppler shifts of interest. A representative time domain sample of the digitized ($V_{xy}$) signal is shown in FIG. 5a.

The A/D converters 68 are followed by fast Fourier transform (FFT) operations 70 which, as is well known in the art, convert the time domain sample signal into inphase ($I_{xy}$) and quadrature ($Q_{xy}$) frequency domain signals known as Doppler spectra. Representative Doppler spectra (power v. frequency) are shown in FIG. 5b.

The inphase and quadrature components at any given frequency are related to the total power and phase produced by a detector 56 at that frequency. Total power is proportional to $I^2 + Q^2$ and phase angle is given by the arctangent of I/Q. The various powers and phases produced by the array 36 of detectors 56 at any one frequency represent different points in the scene under observation which scattered that particular frequency. In other words, they represent an image of the scene in frequency space.

Figure 5B:
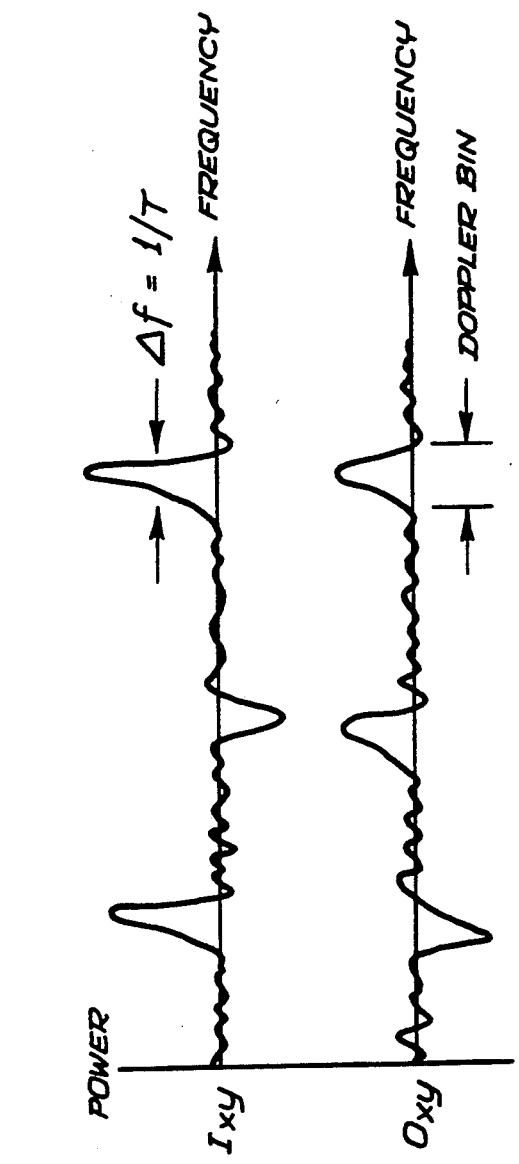

As shown in FIG. 5b, it is usually convenient to break the Doppler spectra into frequency range components known as Doppler bins. Within each Doppler bin, there are inphase and quadrature amplitudes or, equivalently, real amplitude and phase signals defined by the following expression:

$$V_{xy}(f) = B_{xy}(f) \; exp[i\phi_{xy}(f)] \; exp[i\Delta wt]$$

in which "$B_{xy}$" is the amplitude term and "$\phi_{xy}$" is the phase term which contains most of the image information.

Time varying random phase errors, such as might result from mechanical vibration of the array 36 or from atmospheric turbulence across the entrance aperture of the array 36, are compensated by subjecting the separate inphase and quadrature coefficients to a time averaging operation 72.

The FFT functions 70 require a time integration, ideally over all time. In practice, however, the function is evaluated over a limited time interval or "snapshot" time. If the snapshot time is shorter than the time required for atmospheric turbulence changes, for example one millisecond, then the atmosphere will appear frozen during the FFT computation. If separate snapshots are made of the scene at different points in time, each will have a different phase noise as a result of the atmospheric turbulence. The average phase at each detector 56 may be estimated by averaging the successive inphase and quadrature spectra over time, or equivalently, averaging successive phases and amplitudes computed from those spectra. Averaging the phases effectively compensates for the atmospheric turbulence at each sample point.

A computer simulation was conducted to demonstrate the effectiveness of the turbulence compensation. The simulated imaging system included 128 detectors arranged in a Gaussian random array with a 10 meter aperture. The averaging involved 128 time samples taken at 20KHz.

Figure 6A:
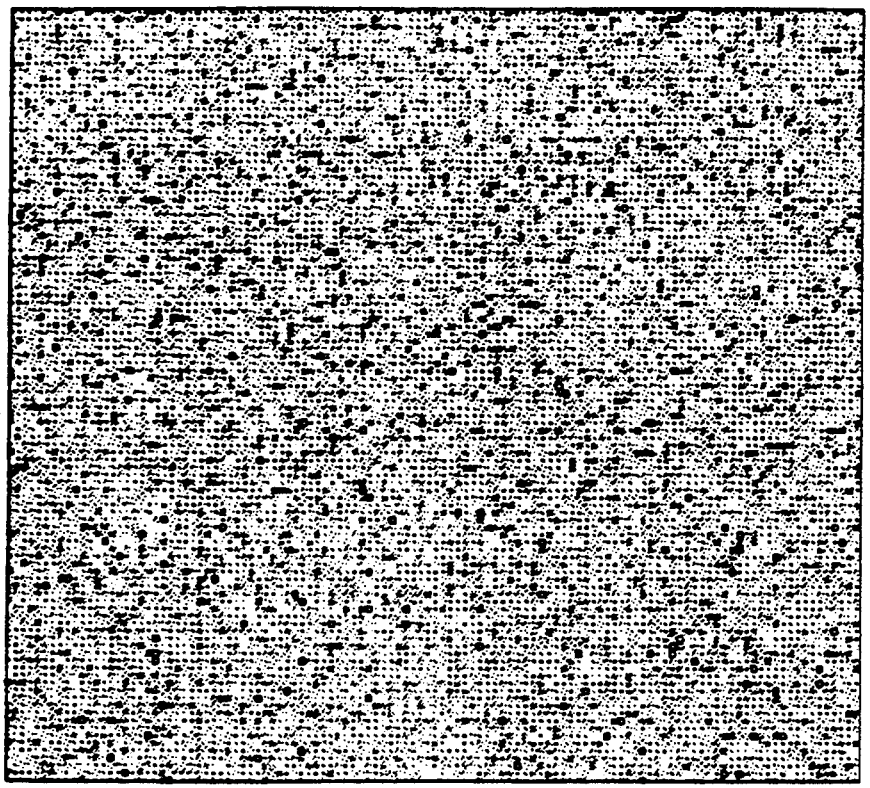
FIGS. 6I-6d are computer output displays illustrating the results of computer simulations of atmospheric turbulence compensation techniques of the present invention.
Figure 6B:
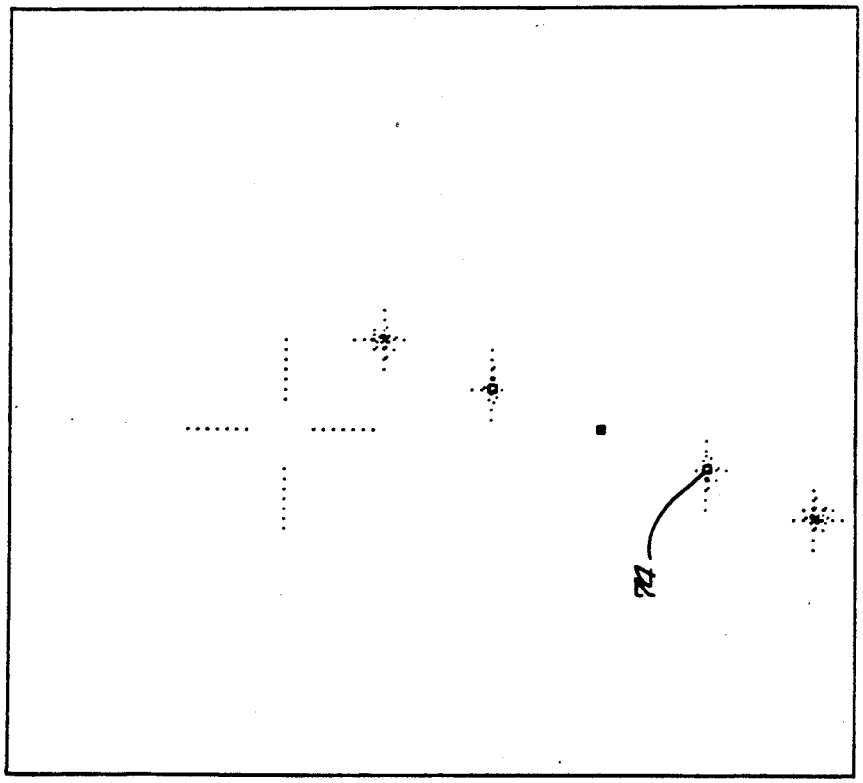

The image shown in FIG. 6a was produced by the simulated system when operating in a turbulence free atmosphere. The target, which consisted of five points 74 arranged in a diagonal line, each with different doppler shifted frequencies, was clearly discernable. FIG. 6b illustrates the effect of adding (without compensation) random phase noise to each detector signal in the array. The target became completely obscured.

Figure 6D:
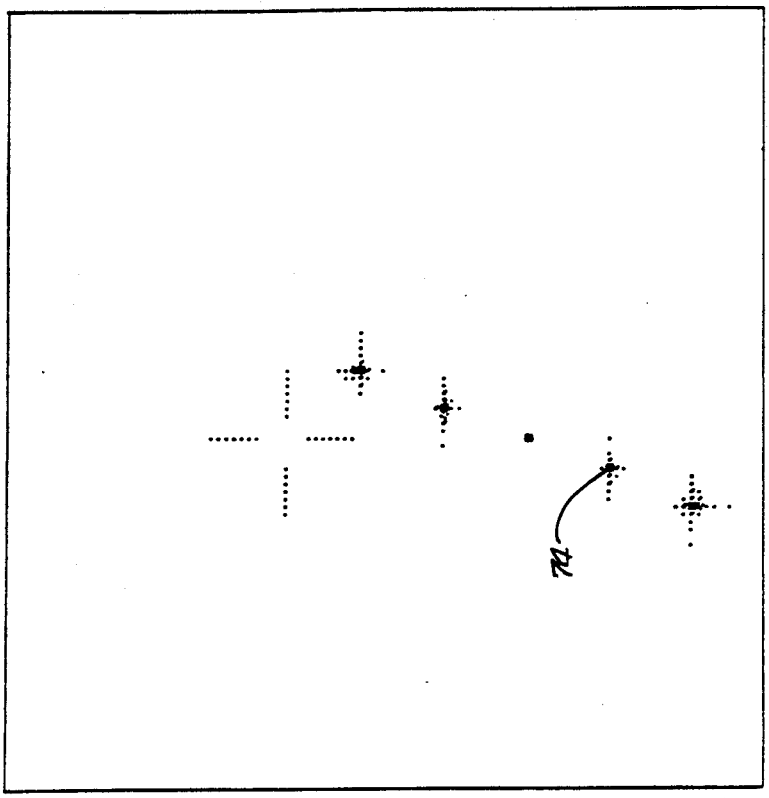
Figure 6C:
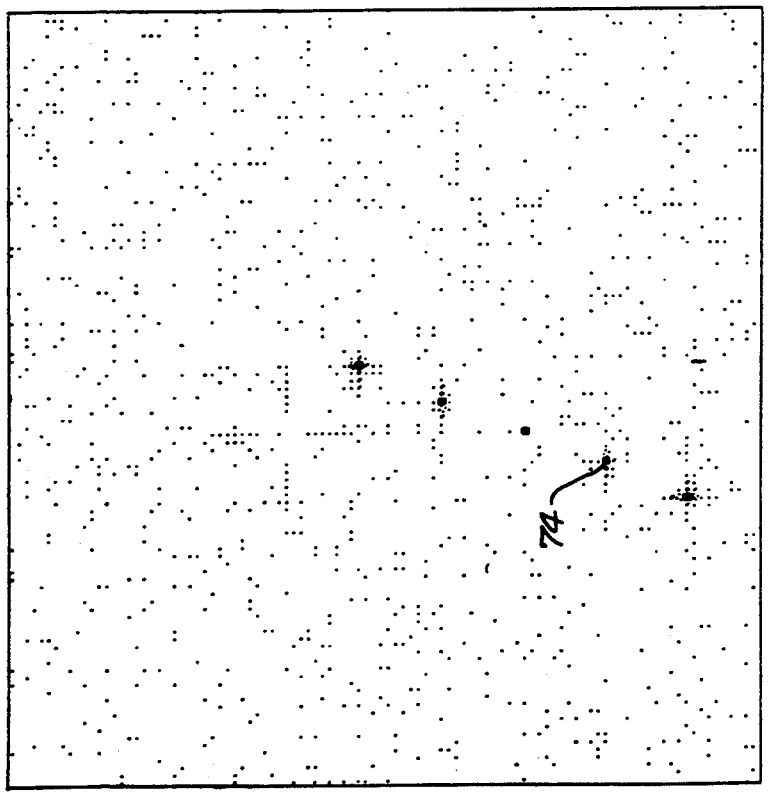
Figure 9:
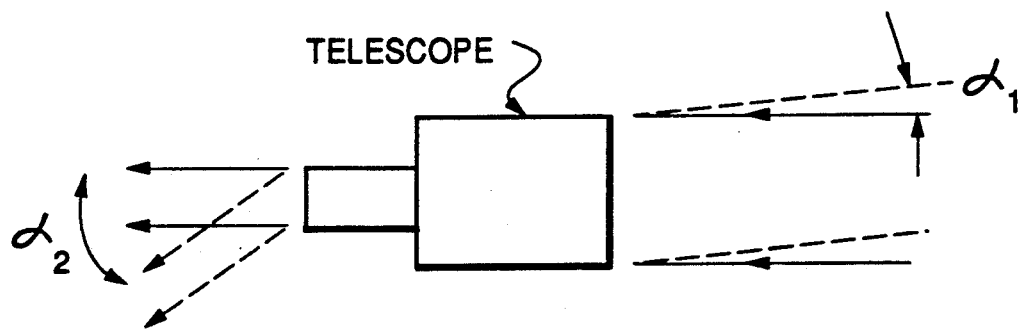
FIG. 9 is a schematic diagram of a telescope of magnification M and the angular relationships between object space and image space.

FIG. 6c shows the results of averaging two snapshots in the accordance with the present invention. FIG. 6d shows the results of averaging four snapshots. It is anticipated that several more frames may have to be averaged in order to image more complex targets. Nevertheless, it is clear that the target image converges very rapidly The time averaging operation 72 has a number of advantages even when the array 36 is used in a non-turbulent atmosphere. For one, it improves signal-to-noise ratio in the same way it compensates for atmospheric turbulence. If successive snapshots are made of a target scene having one or more distinct features of good signal-to-noise ratio such as a glint or edge, averaging the phases of the snapshots will resolve the glints and edges and produce a sharper snapshot image. In addition, the time averaging operation 72 performs a data compression function. It significantly reduces the amount of data which must be processed downstream in order to produce an image.

In addition to being compensated for time varying random phase errors, the Doppler spectra are further subjected to a focus correction operation 76. The focus correction calculates an intermediate signal defined as follows for each Doppler bin:

$$I_{xy}(f) = B_{xy}(f)\exp[i\phi_{xy}(f)]\exp[-i2\pi(x^2 + y^2)/F_L]$$
$$= B_{xy}'(f)\exp[i\phi_{xy}'(f)]$$

where
f refers to the frequency of a Doppler bin,
x and y are the position coordinates of a detector element in the detector array,
$F_L$ is defined as $\lambda F$, where $\lambda$ is the wavelength of the incoming light, F is the desired focal distance of the array, and
$B'_{xy}(f)$ and $\phi'_{xy}(f)$ are amplitude and phase signals which have been corrected for focus.

Although the focus correction 76 is shown in FIG. 4 as being accomplished after the time averaging function 72 as a part of an inverse FT function 78, it will be readily appreciated that it can be performed as a separate function or can be performed prior to the time averaging function 72, if desired.

In addition to the above functions, there exists a large body of known image processing functions, particularly those within the field of radio astronomy, which can be used as options in the present invention to further improve the image quality. Those functions maximize image definition and suppress sidelobe noise by using iterative algorithms to perform post detection phase adjustments. Known variously as the Maximum Entropy Method and CLEAN algorithms, they work best on isolated objects with zero backgrounds or objects with high contrast features such as edges or glints.

The Doppler spectra with corrected phase and amplitude records for all the detectors 56 in the array 36 are coherently combined one frequency bin at a time in an inverse two dimensional spatial Fourier transform (FT) function 78. As is well know in the art, the inverse FT converts spatial amplitude and phase information back into spatial images. Accordingly, the inverse FT function 78 produces successive spatial subimages for each Dobbler bin of the scene under observation. In other words, it produces a series of images each of which illustrates only that part of the scene which scattered a particular range of frequencies.

The successive subimages produced by the inverse FT function 78 are superimposed in an adding operation 80 to recover a complete spatial image 82 of the scene under observation. If desired, the subimages can be color coded to indicate relative target motion.

Numerous hardware configurations can be used to implement the foregoing signal processing techniques. It will be instructive to set out at least one exemplary configuration presently considered to be the preferred implementation, but it is understood that the invention is not limited to that particular configuration.

FIG. 7 illustrates the preferred digital signal processor 82.

As described earlier, the signal beam 60 in each subtelescope 38 is combined with a local oscillator beam 63 to produce an optical heterodyne beat beam 84 which impinges upon a detector or array of detectors 56. The detectors 56 produce electrical signals 86 whose beat frequency, amplitude and phase are linear samples of the signal beams 60. The electrical signals 86 are passed through amplifiers 66 into A/D converters 68 forming a part of the digital processor 82. For ease of explanation, FIG. 7 shows only two detectors 56, designated the "Jth" and the "(J-1)", and shows the complete signal processing equipment for only one of those detectors 56. It will be appreciated, however, that the signals produced by all the detectors 56 in the array 36 are processed simultaneously in an identical manner.

The electrical signals 86 from each subtelescope 38 are separately digitized by high speed analog-to-digital converters 68. The converter 68 resolution depends upon the system dynamic range requirements and the total number of subtelescopes 38. With a large number of subtelescopes 38, the resolution required for each converter 68 may be relaxed because the digitization noise tends to average out in the subsequent parallel processing. Normally, a clock 88 operates the A/D converters 68 at a sampling rate which is equal to or greater than twice the frequency bandwidth of the amplifiers 66.

The serial data streams produced by the A/D converters 68 are clocked into RAM shift registers 90 at the A/D sampling rate. Each sample point N in the detector signal 86 occupies a separate cell 92 in the shift register 90. Hence, the length of the shift register 90 determines the sample time period or snapshot time T. A snapshot time of 1 millisecond is typical.

The data in the shift registers 90 is read out in parallel to a fast Fourier transform (FFT) processor 70 which computes of the inphase (I) and quadrature (Q) spectra. It will be apparent that the input seen by the FFT processor 70 has a form similar to the time domain snapshot sample shown in FIG. 5a.

The total system dynamic range depends largely upon the integration time of the FFT processor 70 and the maximum totals in the shift registers 90. Long integration times can be traded for reduced word size. In some cases, simple one-bit A/D converters 68 and shift register cells 92, may be sufficient. For example, if the sampling rate is 1GHz with one-bit resolution, a one millisecond integration time can produce shift register 90 counts as high as $10^6$. The system dynamic range can be as high as 60dB.

The separate I and Q spectra produced by the FFT processors 70 are serially read into respective I and Q shift registers 94 and 96. The lengths of the registers 94 and 96 are selected to accomodate one snapshot, i.e., the contents of the registers 94 and 96 are the respective I and Q snapshot spectra. Each register cell 95 and 97 contains one Doppler bin. Hence, the frequency resolution of the spectra are determined by the number of cells in each shift register 94 and 96. For example, a 1000 cell shift registers 94 and 96 clocking at 1 GHz would resolve Doppler spectra to about 1 MHz. The maximum detectable Doppler shift would be 500 MHz and the minimum would be 0.5 MHz. The same 1000 cell registers 94 and 96 clocked at 1 MHz would resolve Doppler spectra to about 1 KHz.

The snapshot spectra in the respective I and Q shift registers 94 and 96 are read out in parallel into respective I and Q accumulators 98 and 100. The inputs seen by the accumulators 98 and 100 have forms similar to the respective I and Q Doppler snapshot spectra shown in FIG. 5b. By adding snapshot spectra collected over a suitable length of time, the accumulators 98 and 100 will contain time avereraged I and Q spectra which compensate for time varying random phase errors. As demonstrated above, an accumulation time which averages two to four snapshot frames will often be sufficient to suppress the phase errors caused by atmospheric turbulence.

The accumulators 98 and 100 include a plurality of cells 99 and 101 each of which contains one Doppler bin of the time averaged I and Q spectra. The cells 99 and 101 are scanned to read respective I and Q spectra out of the accumulators 98 and 100 one Doppler bin at a time. The I-Q data pair for a given Doppler bin contains corrected phase information for that bin, i.e., it provides the corrected phase for the associated detector 56 when receiving that range of frequencies. A collection of such phase information for all the detectors 56 in the array 36 provides an image in Fourier transform space of the portions of the scene under observation which scattered that particular range of frequencies.

The serial streams of I-Q data pairs from all the detectors 56 in the array 36 (designated "Jth", "(J−1)", (j+1th"...) are read into an inverse Fourier transform (FT) processor 78 having a self-contained focus correction operation 76. The inverse FT processor 78 converts each of the Fourier transform images into a spatial subimage, i.e.. a picture of those portions of the scene under observation which scattered the frequencies in that particular Doppler bin. The inverse FT processor 78 operates on the incoming serial data streams one Doppler bin at a time to produce a sequence of spatial subimages each of which corresponds to a different Doppler bin. The subimages are serially read into a temporary picture storage 102.

An optional off-line iterative subroutine 104 can be used to sharpen the subimage pictures and to suppress background noise. A preferred subroutine uses the CLEAN algorthim which is well known in the radio astronomy field. Trial corrections to the phase are kept if they improve the final image. For an array with relatively few subtelescopes, only a few degrees of freedom need be searched. In addition to piston corrections, the algorithm performs post detection corrections for tilt, rotation, and transverse telescope spacing The various subimages are accumulated in an adder 80. The adder 80 superimposes the subimages to produce a complete, composite image or picture of the scene under observation. The final picture is then displayed by the use of a conventional computer read out or display device 82.

The above described signal processing techniques have a number of advantages which now can be readily appreciated.

First, it gives the array 36 the capability to detect weak target signals. In general, any target within the mutual fields-of-view of the subtelescopes 38 will exhibit a Doppler power spectrum. The inverse FT and subimage addition synthesizes the light gathering power of a single large aperture because the Doppler power spectra from all the FFT operations are added in phase. This allows the signals from each of the subtelescopes 38 to contribute to the overall signal-to-noise ratio without destructive interference due to mismatched optical paths.

Second, the signal processing gives the array 36 the high pointing accuracy of a large aperture. The difference in phase angle between subtelescopes 38 at a particular frequency is determined from the FFT Doppler spectra. The phase difference indicates the path delay between the subtelescopes 38. The path delay in radians is 2 pi times the piston error in fractions of a wavelength at that specific (Doppler shifted RF) frequency. The piston error is directly related to the pointing angle, as can be seen in FIG. 3. The phase spectra can also indicate diffferent angles for different targets which are simultaneously within the field of view of a single detector 56 at each subtelescope 38. By adding the phase spectra of the various subtelescopes 38, the angular resolving power of the array 36 becomes the diffraction limit of the synthesized large aperture. The instantaneous field of view is given by the broader diffraction limited resolution of the individual subtelescopes 38.

Third, the signal processing allows the array to reconstruct images of a scene under observation. With a sufficiently large number of subtelescopes 38 ordered in a two dimensional array, the resulting I and Q spectra represent discrete amplitude and relative phase measurements of the incident wavefronts. They effectively constitute a discreetly sampled holographic recording, or equivalently, a recording of the scene in Fourier transform space. The two dimensional inverse Fourier transform recovers the scene as a picture in space.

Fourth, computer simulations have shown that the system of the present invention is capable of imaging targets which are illumiated by either a single frequency source (e.g. laser illuminated targets) or a multiple frequency source (e.g. white light or passively illuminated targets). The received signal is resolved into many separate frequency channels or Doppler bins. For each Doppler bin, the amplitudes and relative phases are calculated at each detector and a Doppler subpicture is computed. The final picture is a superposition of the subpictures for all detected frequencies. Accordingly, the signal processing technique of the invention can readily reconstruct an image of a target which scatters multiple frequencies.

This result is especially significant because it permits the use of white light or passive imaging with the heterodyne array 36. Any incoming light which produces any combination of one or more beat frequencies which lie within the electrical bandwidth of the receiver can be used to make an image. Clearly, a wide electrical bandwidth will capture more white light photons. Also, a wide electrical bandwidth relaxes the stability requirements on both the local oscillator and on high powered illuminating lasers. Sensitivity calculations indicate that, at infrared wavelengths, a one square meter capture area receiver with a 1 GHz bandwidth could image room temperature objects at ranges of several hundred kilometers.

It is appreciated that the novel signal processing techniques described above are not limited to optical receiver arrays but could be used with any type of phase coherent receiver array such as those used in a radio telescope or radar.

In addition, it will be immediately apparent that the optical array of the present invention is not limited to the specific signal processing techniques described above. Numerous alternative techniques are available for accomplishing the same end result.

An alternative signal processing technique which operates in the frequency domain uses the well known cross correlation function.

The digitized serial data streams between adjacent pairs of subtelescopes would be combined in digital cross correlators. The cross correlation function performs a time integration on the data stream. Its effect is to compress the data rate for more easily manageable processing in later stages, to compare all optical path mismatches, and to perform a noise cancellation function. The cross correlation operation preserves the amplitude, frequency, and relative phase information of the incoming signals. The cross correlators would be followed by fast Fourier tranform operations which would produce inphase and quadrature power versus frequency spectra. The I and Q spectra would be further processed (e.g. added) to yield total received power versus frequency spectra and relative phase versus frequency spectra for the adjacent pairs of subtelescopes. The resulting power and phase spectra for adjacent subtelescopes would then be further combined to yield total array response signals.

With a sufficiently large array of subtelescopes, it would be possible to reconstruct two dimensional images. If the subtelescopes were ordered in a 2-D array, cross correlations would be possible between adjacent telescope pairs in both X and Y directions. The resulting I and Q spectra would represent discrete amplitude and relative phase measurements of the incident wavefronts. It would amount to a discreetly sampled holographic recording, or equivalently, a recording of the input scene in Fourier transform space. A two dimensional inverse Fourier transform would then recover the scene.

An alternative signal processing technique is also available in the time domain. The correlation operation described above performs a time average and thus suppresses time varying amplitude information. It can, however, indicate the spectral content or bandwidth of pulsed received signals and their average amplitudes. For distance ranging and other non-imaging applications, additional signal processing is required.

The correlated phase versus frequency records indicate the relative time delays between subtelescope outputs which will give a maximum correlation or constructive interference between signals. That time delay information can be used to assign delay times for temporal signal processing. If the subtelescope signals are thus appropriately delayed and summed, all of the signals will constructively add to give the highest possible array sensitivity. The resulting temporal signal can be processed as in any conventional receiver.

The correlation and FT operations can be carried out separately and in parallel with temporal processing to continually update the selection of subtelescope delays. Digital signal processing permits shift registers to serve as delay lines. Digital processing also allows parallel processing without loss of signal strength in any processing channel.

The concepts of the present invention are not limited to arrays of distributed small telescopes. Computer simulations have shown that they are equally applicable to an array of heterodyne detector elements placed behind a single large aperture telescope substantially near a surface conjugate to the entrance pupil.

A single telescope embodiment incorporating features of the present invention is shown schematically in FIG. 8. A large aperture afocal telescope 106 collects light from a scene under observation and produces a collimated demagnified beam 110. A beam splitter 112 combines the collimated beam with a local oscillator beam 114 to produce a beat beam 116 which is directed onto an array 118 of optical detectors 120. The detector array is located substantially near a plane which is conjugate to the entrance aperture of the telescope 106. With such an array 118, each detector 120 is mapped to a patch 122 of the entrance aperture with a magnification determined by the magnification ratio of the telescope 106. The electrical signals produced by the detectors 120 are passed through amplifiers 124 into a signal processor of the type described above.

Because the signal processing techniques used with the subtelescope array 36 are equally applicable to the array 118 used with a single large aperture telescope, the telescope shown in FIG. 8 has performance capabilites beyond those normally associated with a single large aperture telescope. Most notable is the ability to compensate for atmospheric turbulence.

Additional embodiments of electronically phased arrays or pluralities of arrays of heterodyne optical detectors to record the amplitude and phase of arriving lightwaves for the purpose of electronically forming images will now be described.

Figure 10:
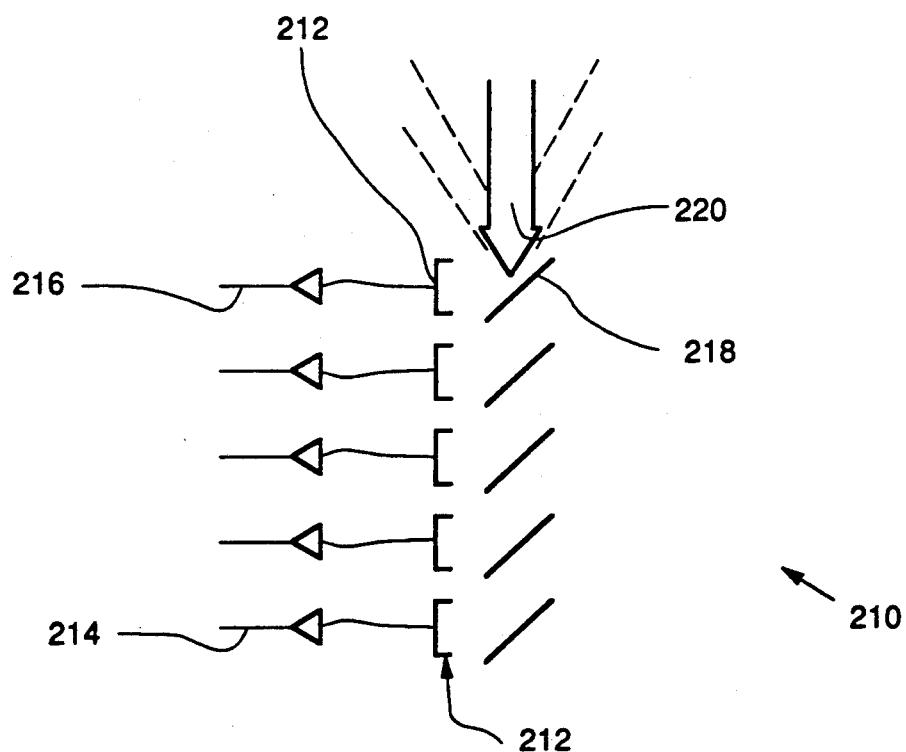
FIG. 10 is a schematic diagram of a coherent array of optical heterodyne detectors amounting to an electronic telescope without focusing optics.

As illustrated in the schematic diagram of FIG. 10, a coherent array 210 of optical heterodyne detectors 212 has a plurality of individual preamplifiers 214 connected to them giving rise to electrical output signals 216. A plurality of individual beamsplitters 218 are positioned above individual detectors 212 to divert portions of a local oscillator beam 220 into detectors 212.

The arrangement shown in FIG. 10 amounts to a telescope without focusing optics which has a magnification of unity and a field of view equal to $2\pi$ steradians. The line of sight of the telescope represented by detector array 210 can be steered by changing the angle of arrival of local oscillator beam 220 at detectors 212. Detectors 212 will produce coherent output beats only for arriving waves which are spatially coherent with local oscillator beam 220.

Beam steering agility (on receive) is achieved by mechanically (or otherwise) tilting beamsplitters 218. For waves slightly off the line of sight but within the diffraction field of a single detector 212, the direction of incidence can be computed from phase differences in the output signals 216 of the preamplifiers 214.

Figure 11:
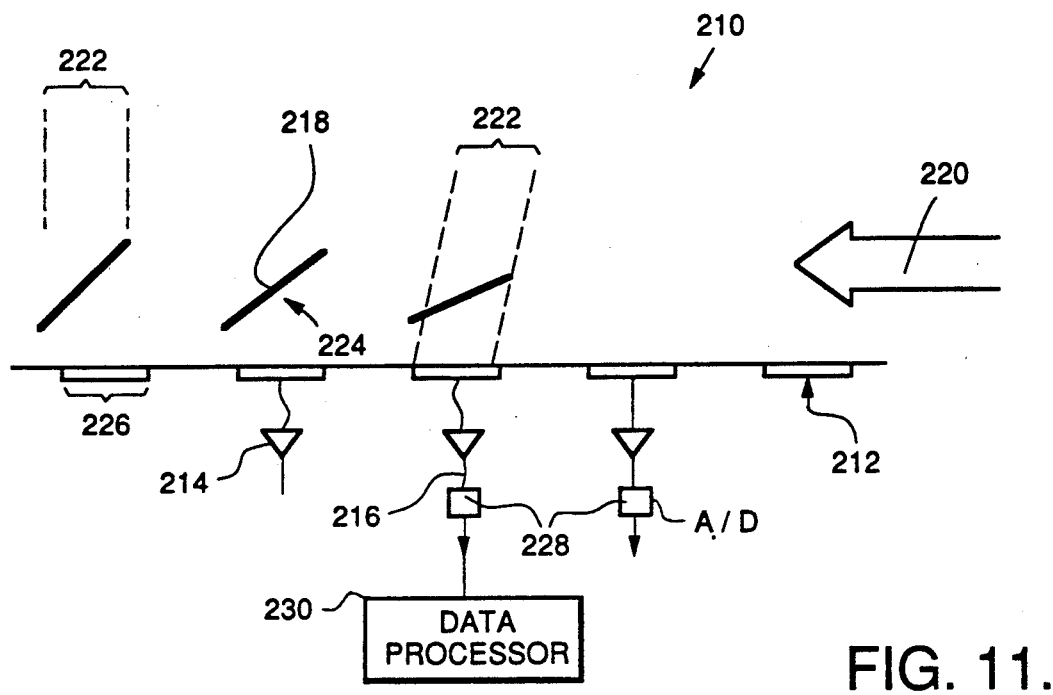
FIG. 11 is a schematic diagram of a staring fanbeam array constructed from a plurality of detectors and progressively tilted beamsplitters.

Considering the linear array of discrete detectors 212 and beamsplitters 218 as shown in FIG. 11, it can be seen that each detector 212 has a different line of sight 222 due to different angles of tilt 224 of beamsplitters 218. The field of view of each detector 212 is given by the diffraction limit of the detector dimension d 226. If the wavelength of the received light is denoted by L, the half-power points are at angles of incidence (with respect to the normal to the detector surface) given approximately by $\pm L/d$.

As illustrated in FIG. 11, each detector 212 has an analog-to-digital (A/D) converter 228 which accepts output signal 216 coming from preamplifier 214. The outputs of the A/D converters 228 all go to signal processing means 230.

Figure 12:
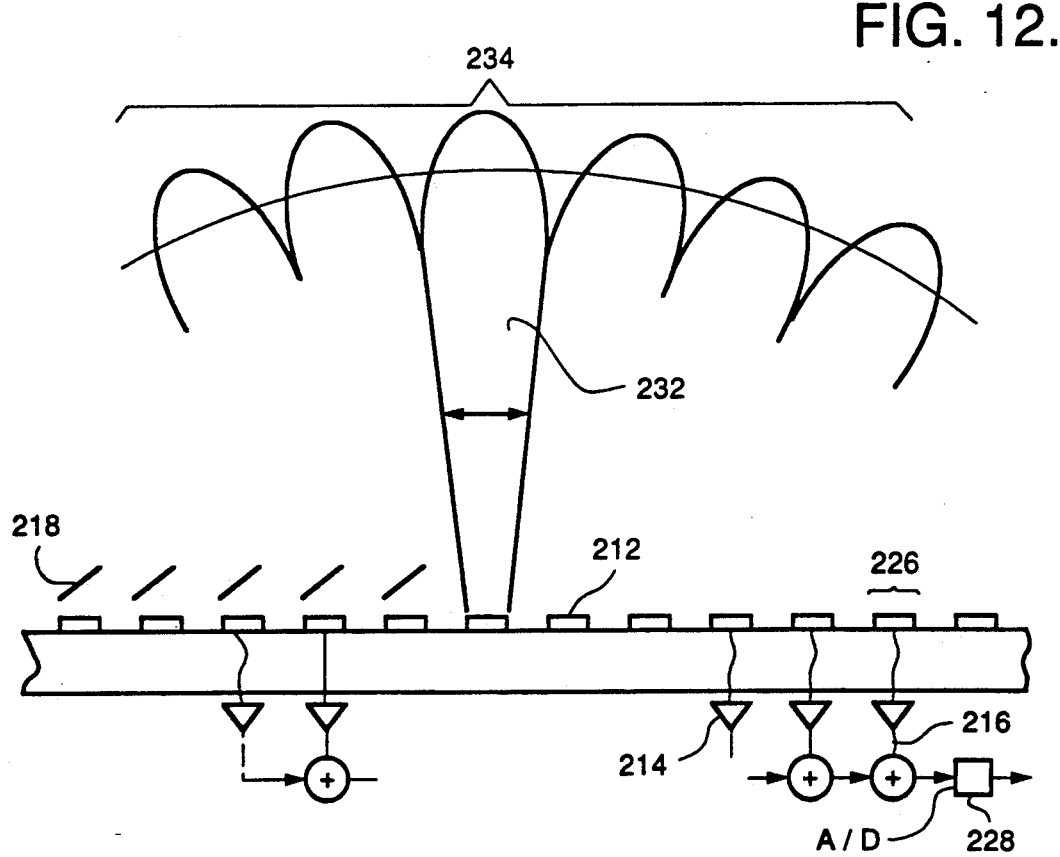
FIG. 12 is a schematic diagram of a staring detector array showing how the fields of view of the diffraction limited detectors overlap to form a continuous fanbeam.

FIG. 12 is a schematic diagram of a staring detector array showing how the fields of view 232 of the diffraction limited detectors 212 overlap to form a continuous fanbeam 234. As a specific example, consider a light Wavelength of $L=10\ \mu$, corresponding roughly to the infrared output of a $CO_2$ laser, and a detector dimension d 226 of 1 mm. The angle L/d is equal to $10^2$ or 0.57 degrees. In order to cover a 20-degree arc, 35 detectors are needed and the beamsplitters 218 must be tilted +5 degrees and −5 degrees about their central position. A fanbeam of 20 degrees by 0.57 degrees is produced by this array, and to cover a 20 degree by 20 degree field of view would require 35 fanbeams in parallel.

Figure 14:
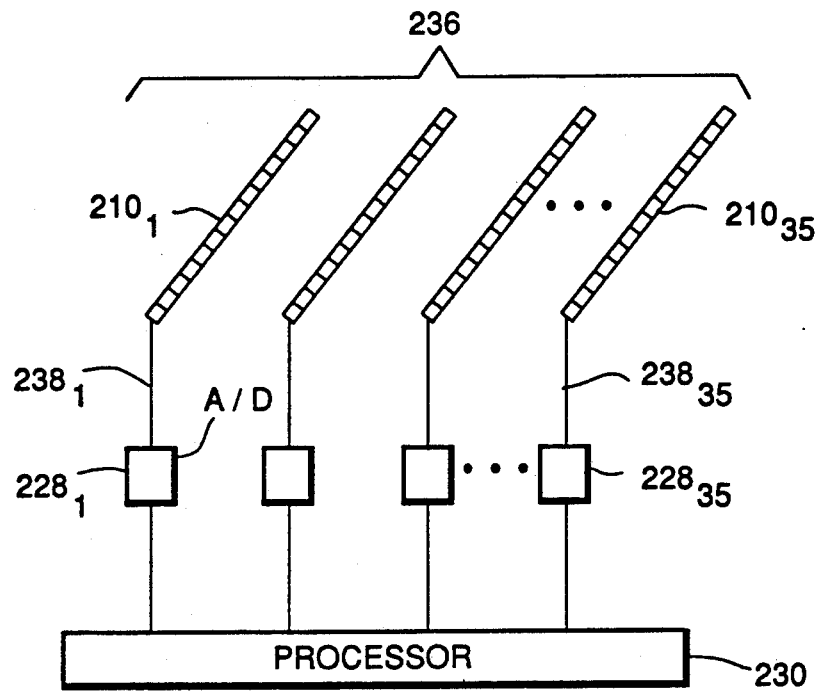
FIG. 14 is a schematic diagram of a two-dimensional detector array and its associated data processors and image forming means.

FIG. 13 is a schematic diagram showing how multiple fanbeams can map an entire two-dimensional field of view. A collection of detectors 212 giving rise to multiple fanbeams 234 will be referred to herein as a "detector group" 236. Suppose that the detector group 236 of FIG. 13 consists of linear arrays 210 of 35 detectors in each linear array. The detector group 236 will contain $35 \times 35 = 1225$ detectors and preamplifiers plus 35 analog-to-digital converters. As shown in FIG. 14, there will be 35 digital data streams 238 produced as outputs of detector group 236. Each digital data stream 238 records the summed signal from an entire fanbeam array. Detector group 236 makes up a staring array which looks at the entire 20 degree by 20 degree field of view but divides it into 35 parallel slices 240. Effectively the fanbeam fields of view 240 measure a spatial Fourier component of the image within the field of view, but only along the direction 242 perpendicular to the fan.

Referring to FIG. 13, if the detector group 236 is then rotated through a small angle about the normal 244 to the planar array, a different Fourier component can be measured. Rotations of the detector group 236 through all possible angles about axis 244 will yield all Fourier components of the scene. By inverse transformation of the Fourier components the real image can be reconstructed.

The reconstruction of an image from multiple parallel slices is analogous to computerized axial tomography or CAT scanning used in medicine for diagnostic imaging using X rays or gamma rays. It is also similar to the image reconstruction method used by radio astronomers when utilizing multiple-aperture interfering radio telescopes. The Very Large Array (VLA) radio telescope in central New Mexico, for example, uses 27 large dish antennas in a Y-shaped formation. By coherently adding the outputs from any two dish antennas, a parallel fringe pattern can be projected into space. By using many possible antenna pairs, Fourier components in many directions can be used to reconstruct a high-resolution image of distant radio sources.

The fan array shown in FIG. 13 is capable of resolving pixels in the field of view which are only as fine as the width of a fan, in this case 0.57 degrees. This resolution represents the diffraction limit of an aperture of 1 mm. Much higher resolution can be obtained by processing the coherently interfering outputs of multiple detector groups 236, as shown in FIG. 15. The effective aperture size will then be the largest possible spacing D 246 between detector groups 236. If a long linear array 248 of detector groups 236 is rotated about an axis 250 along the line of sight, a rotation of 180 degrees yields all possible projections of the fanbeams 234 on the field of view. The reconstructed image can have the resolution of a telescope with a circular aperture of diameter D, and this can be many meters.

The SPINNOR (for "spinning optical radar") concept when used as an active radar relies on coherent detection of laser illuminated targets. All phase information in the received beam is preserved in the detector electrical output signals 216. For example, with reference to FIG. 15, a fanbeam 234 from detector group $236_1$ and fan $234_1$ can be electronically allowed to interfere with a fanbeam from detector group $236_N$ and fan $234_1$ by combining and appropriately delaying electrical signals. Parallel processing of the many data streams 238 can electronically synthesize many different beams simultaneously.

The individual detector elements 212 as depicted in FIGS. 11 and 12 do not have to be closely packed. The SPINNOR concept allows ample room to package a sensitive high-speed preamplifier 214 with each detector element 212. This is an important simplification over conventional focal-plane detector arrays.

Figure 16:
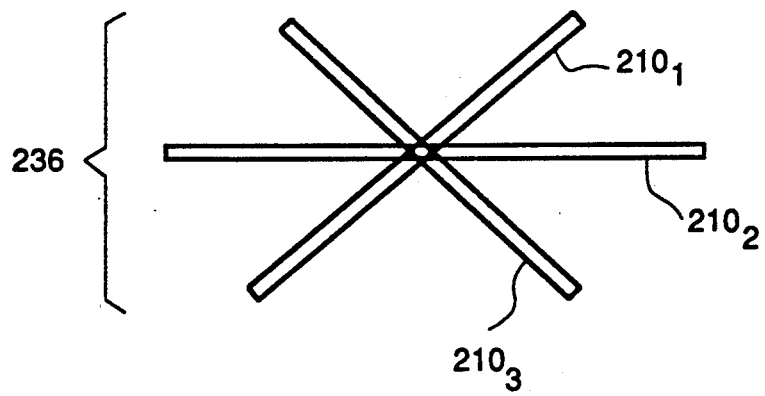
FIG. 16 is a schematic diagram showing how multiple linear arrays can reduce the amount of angular rotation required to scan a complete field of view.

SPINNOR looks at the entire field of view all the time. Incoming signals are integrated for the time required to perform a 180-degree rotation. Shorter integration times may be achieved by using multiple linear arrays, as illustrated in FIG. 16. With the six-fold symmetry of the arrangement shown, the integration time is reduced to the time necessary to perform a 60-degree rotation.

Because SPINNOR is a staring array, the laser transmitter of an active radar system needs no beam steering. It may transmit a very wide beam that completely fills the field of view. Alternatively, a transmitter might dwell on a limited area to enhance the signal-to-noise ratios on selected targets. By comparison, a conventional system would employ a highly collimated transmitter beam which scans the total field of view in a raster pattern in synchronism with the receiver. The dwell time on any single target would necessarily be short if the system were required to scan the entire field of view periodically (say in one second). By contrast, SPINNOR supplies a low but constant illumination on all targets simultaneously for the scan period (say one second). In many cases, SPINNOR can receive the same total number of photons from a target as a raster scanning system does. Note that the transmitter polarization must rotate to follow the receiver, or else circular polarization must be employed.

FIG. 12 shows one A/D converter 228 for each detector whereas FIG. 11 shows one A/D converter 228 for each fanbeam. Either alternative is feasible and very simple A/Ds can be used. Suppose a given target returns only 10 photons per pixel. Those few photons will be coherently received across the entire array of many thousands of detectors (or some subset of the total number of detectors). The return signal will be quite undetectable in the output of any one detector.

The detector outputs will principally show only shot noise due to the local oscillator power. Only when many detector outputs are coherently processed will the presence of a return signal be noticed. Since the detectors are responding mostly to shot noise, the requirements for dynamic range of the A/D converters are very modest. The local oscillator shot noise should have very uniform or limited peak amplitude fluctuations. One-bit A/D converters might be used at each detector preamplifier or, alternatively, summing an entire row of 35 detectors might require an A/D converter with no more than 35 levels of resolution, or about 5 bits. A one-bit A/D converter would sample at some high rate, say 1 GHz. Its output would indicate whether the analog signal (AC coupled) was positive or negative during the sampling interval. The SPINNOR concept permits digitization very early in the signal processing path and allows multiple-path parallel processing.

Guided-Wave Beamsplitter

Figure 18:
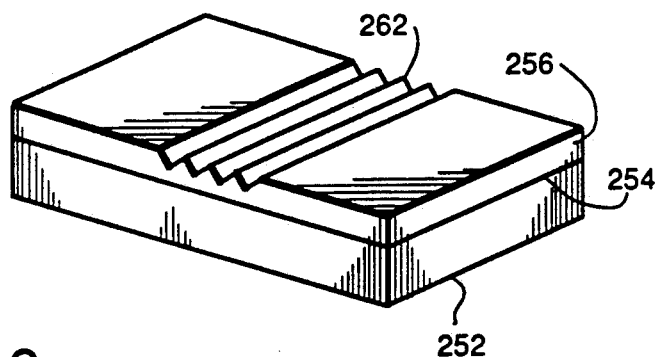
FIG. 18 is a perspective view of a corrugation grating on the surface of a thin-film guided-wave beamsplitter.

Like all heterodyne detectors, the present invention requires that a local-oscillator wave be superimposed on the incoming signal waves before the waves reach the detector elements. This is usually accomplished by means of a beamsplitting optical element, such as a flat glass plate with a partially reflecting and partially transmitting surface coating (depicted schematically in FIGS. 10, 11, 12, and 17 and designated by reference numeral 218). FIGS. 17 and 18 illustrate a novel method for introducing the local-oscillator wave 260 to an array 210 of detector elements 212. In this invention, the detector elements 212 are encapsulated in a material 252 which is uniform and transparent at the operating wavelength. The upper surface 254 of the encapsulating material 252 is further treated with one or more thin-film layers 256 of a transparent material having an index of refraction greater than the encapsulant 252. The thin-film layers 256 constitute the well-known structure called a dielectric waveguide 258. (See, for example, the textbook *Optical Electronics*, by A. Yariv, 3rd edition, chapter 13, "Propagation, Modulation, and Oscillation in Optical Dielectric Waveguides," Holt, Rinehart, and Winston, publishers.)

In the present invention, the local-oscillator wave 260 may be introduced as a wave which propagates along the dielectric waveguide 258 in a direction 260 parallel to the plane of the detectors 212. Immediately above each detector location, as shown in FIG. 18, a low-relief (much less than ¼ wavelength depth) periodic corrugation 262 is etched into the dielectric waveguide 258. The corrugation 262 acts as a low-efficiency diffraction grating whose function is to divert a percentage of the local-oscillator wave 220 out of the waveguide 258 and toward the detector element 212. Such corrugated etchings are known in the art (see page 422 of the textbook by Yariv) but have not been previously employed to direct local-oscillator waves.

The guided-wave beamsplitter, when applied to distribution of the local-oscillator waves, has several important advantages over a discrete beamsplitter optical element. It is compact and rugged. It permits the local-oscillator waves to be deposited only over the detector surface and not on the spaces between detectors, which makes for efficient use of local-oscillator power. The guided-wave beamsplitter has further applications beyond pupil-plane imaging systems. It may also be applied to arrays of detectors used in a conventional focal plane imaging system, as might be required to make heterodyne Doppler measurements. With conventional focal-plane array imaging systems, the introduction of local-oscillator waves by means of the usual discrete beamsplitter optical elements usually leads to significant performance degradations. A discrete beamsplitter element must necessarily have a substantial thickness to be mechanically rugged. A thick element at a tilted angle within the optical beam path invariably leads to severe aberrations which significantly reduce the optical imaging performance. For this reason, arrays of optical detectors are rarely used to make heterodyne measurements. The present invention relieves such restrictions.

Conformal Arrays

In accordance with the invention, images may be formed by an array of heterodyne detector elements in a pupil-conjugate plane of a system. One pupil-conjugate plane of particular interest is the entrance pupil itself.

One arrangement in accordance with the invention is to use the detector array 210 with its thin-film guided-wave beamsplitter 258 as the entire optical system, as shown in FIG. 19. No other optical elements need be placed in front of the array 210. Such an array 210 can directly detect the amplitude and phase of incoming waves 264, thereby producing a data stream 238 of electrical signals which may be processed by image processor 266 to form images. The result is, in essence, a telescope without conventional optics of any kind.

Several novel features of this additional embodiment are immediately apparent. The entire array structure may be very thin. The supporting structure is required only to be sufficiently strong and rigid to hold the array to optically known positions.

Furthermore, it is not necessary that the array be flat. So long as the relative positions of the array elements are known or may be determined to optical tolerances, the resulting electrical signals may be analyzed to determine the phase and amplitude relationships of the incoming light waves as if they had been received on a flat surface or any other surface. The shape of the array may be curved to conform to almost any convenient surface, such as the outer surface of an aircraft wing or body. Such "conformal arrays" are known in microwave radar systems but have been previously unknown in optical imaging systems.

Multiple Local Oscillator Frequencies

The operation of electronically phased pupil-plane arrays is most easily understood when the scene being imaged is imagined to emit light of only one frequency, as if it were illuminated by a laser light source. However, optical heterodyne detectors which use laser light as a local-oscillator wave are fully capable of detecting and imaging white-light illuminated scenes. Such heterodyne detection of incoherent sources is commonly referred to as "heterodyne radiometry". Imaging heterodyne radiometry is routinely practiced by radio astronomers at microwave frequencies. Heterodyne radiometry of incoherently illuminated scenes suffers from one principal disadvantage compared to conventional detection schemes. The light emitted by an incoherent scene contains a continuous distribution of many wavelengths or frequencies. A heterodyne radiometer can detect only a relatively small bandwidth of those light frequencies, namely only frequencies which can be heterodyned to fall within the passband of the electronic circuits which follow the optical detector element. While a relatively small bandwidth may be adequate for many purposes, such as radio astronomy, the heterodyne radiometer typically has greatly reduced sensitivity to faint scenes as compared to a direct detection imaging system.

Figure 20:
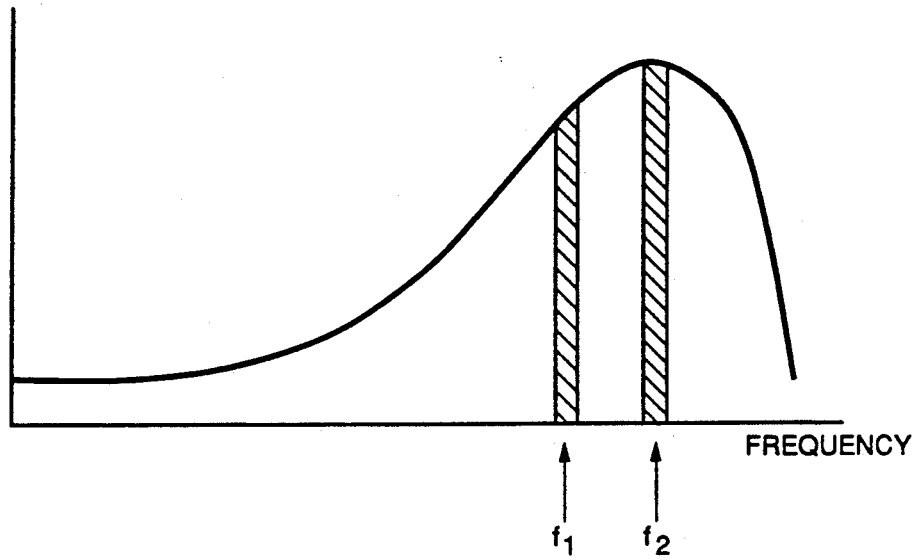
FIG. 20 is a typical curve of radiated power versus frequency for a warm object; the crosshatched areas indicate portions of the spectrum heterodyned into the bandpass of the electronic processor with two local oscillators having different frequencies.

The optical phased arrays described herein can be made much more sensitive than conventional heterodyne radiometers by a novel application of multiple local-oscillator frequencies. FIG. 20 illustrates the typical radiated power versus frequency or spectrum of a warm object. The crosshatched area under the curve illustrates the portion of the spectrum which can be detected by a heterodyne radiometer with a single local-oscillator frequency designated $f_1$. The frequency width of the cross hatched area is equal to the bandpass of the electronic circuits or twice the bandpass in the case of double-sideband detection systems.

If a second local-oscillator frequency designated $f_2$ is simultaneously applied to tho detector or detector array, a second portion of the spectrum can be heterodyned into the bandpass of the electronic processor. In this manner, twice as much total spectrum is sampled. The sensitivity of the heterodyne radiometer to the incoherent scene will be increased, but not in a linear fashion.

As more local-oscillator frequencies are simultaneously applied to a heterodyne detector, the portion of sampled spectrum increases linearly. However, the total local-oscillator power on the detector also increases and with it the well known local-oscillator-induced shot noise. A conventional analysis indicates that while the detected signal will increase linearly with the number of local-oscillator frequencies, the shot noise will increase as the square root of the number of local-oscillator frequencies. Thus the signal-to-noise ratio of the detection system will increase overall as the square root of the number of local-oscillator frequencies. The use of 100 local-oscillator frequencies will increase the system sensitivity a factor of 10 over the sensitivity of a system with only one local-oscillator frequency.

When using multiple local-oscillator frequencies, it is also necessary to observe the restriction that such frequencies be spaced sufficiently far apart that no two frequencies will produce a local beat which can lie within the electronic processor bandwidth. This means that local-oscillator frequencies must be spaced farther apart than twice the electronic passband, which is equivalent to requiring that the crosshatched areas of FIG. 20 do not overlap and that no portion of the received spectrum can be used more than once.

Multiple local-oscillator frequencies may be conveniently obtained from a multiple-mode laser source. Since a very large number of local-oscillator frequencies may be desirable, a large-bandwidth dye laser would be a suitable local-oscillator source. With a suitably designed laser source, greater that 100,000 local-oscillator frequencies could be obtained at visible wavelengths. The practical upper limit may be above one million frequencies, which implies a sensitivity improvement of a thousandfold over a single-frequency local-oscillator detection system. Very large numbers of local-oscillator frequencies are practical at infrared and visible wavelengths but are not practical at microwave wavelengths.

Data Processing

A large baseline D permits very high resolution and a huge number of resolvable pixels in the field of view. Not every pixel would need to be calculated. In the majority of space-based applications, most pixels would be empty and uninteresting.

Figure 21:
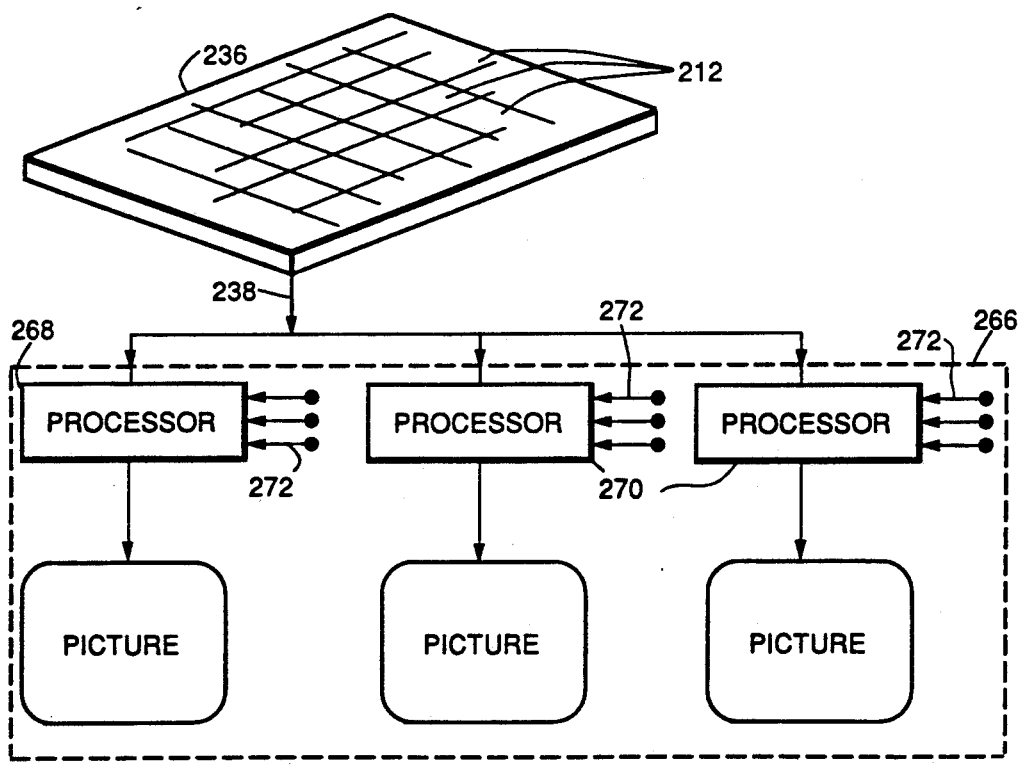
FIG. 21 is a schematic diagram of a two-dimensional array of optical heterodyne detectors connected to signal processing and image forming electronics utilizing digital beam-forming algorithms.

With SPINNOR it will be possible to assign multiple processors to handle the data stream, as shown in FIG. 21. Thus, a first processor 268 might be assigned to synthesize low-resolution images to search for target clusters. Other processors 270 might then synthesize high-resolution pixels in very restricted fields of view to determine specific features of targets or target clusters. The inputs 272 to processors 268 and 270 would include information about direction of sight, field of view (magnification), and integration time.

Feasibility of Data Processing Rates

Whether one or many local-oscillator frequencies are used, the sensitivity of an imaging heterodyne radiometer is directly proportional to the electronic processor bandwidth. There is a large premium on processor speed.

The processor is embodied in a highly parallel architecture. Each detector channel is processed separately through the steps of Fourier spectrum analysis and time averaging. Then the separate channels are combined to form a time-averaged image. Time averaging before combining channels is an important step which leads to substantial noise cancellation and data rate compression. Most of the noise in such an imaging system is local-oscillator-induced shot noise, which is neither temporally coherent nor coherent from channel to channel. Shot noise is effectively suppressed by both time and spatial averaging. The processor is highly noise tolerant.

Digitization is implemented at the earliest possible point, immediately following the detector preamplifiers. Digital processing has many obvious advantages, including the availability of simple memory elements, such as shift registers. However, digitization of the continuously varying detector voltages carries the risk of losing information. Fortunately, the information loss is very slight and has been thoroughly analyzed by the radio astronomy community.

Figures 22A, 22B, 22C:
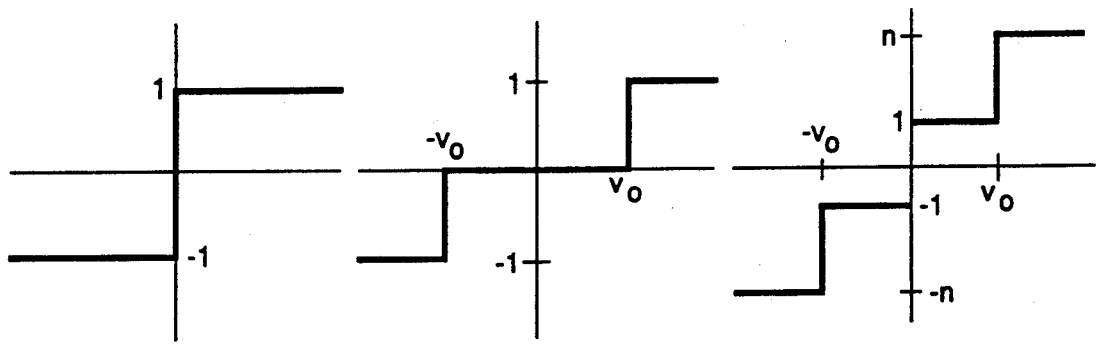
FIGS. 22a, 22b, and 22c are characteristic curves of input voltage versus quantized output voltage for one-, two-and three-level signal quantization, respectively.

FIGS. 22a, 22b, and 22c are characteristic curves of input voltage versus quantized output voltage for one-, two-and three-level signal quantization, respectively. Table 1, below, from Proc. of IEEE, Vol 71, No. 11, November, 1983, shows the degradation in sensitivity for various quantization schemes.

TABLE 1

| Degradation in Sensitivity for Various Quantization Schemes | | |
|---|---|---|
| Number of | Sensitivity Relative to Analog Correlator | |
| Quantization Levels | Sampling rate = Nyquist rate | Sampling rate = 2 × Nyquist rate |
| 2 | 0.64 | 0.74 |
| 3 | 0.81 | 0.89 |
| 4 | 0.88 | 0.94 |

Table 1 indicates that a simple two-level or binary digitization sampled at the Nyquist rate will reduce the signal-to-noise ratio to 64% of a full analog processor of comparable bandwidth. Furthermore, sampling at twice the Nyquist rate increases the signal-to-noise performance to 74% of the analog processor. It is, therefore, entirely practical to employ simple binary or one-bit analog-to-digital digital converters in the processor. Single-bit logic is currently available at speeds as high as 10 GHz, which implies that practical digital image processor bandwidths of several GHz are achievable.

Beam Forming Processor

An imaging array will in general have a large number of detector elements, typically from $10^4$ to $10^7$, with high-speed sampling (typically at 1 GHz) on each element. As was discussed above with respect to FIG. 21, programmable processors which are capable of forming independent images with restricted fields of view share the data stream coming from the detector array.

Figure 23:
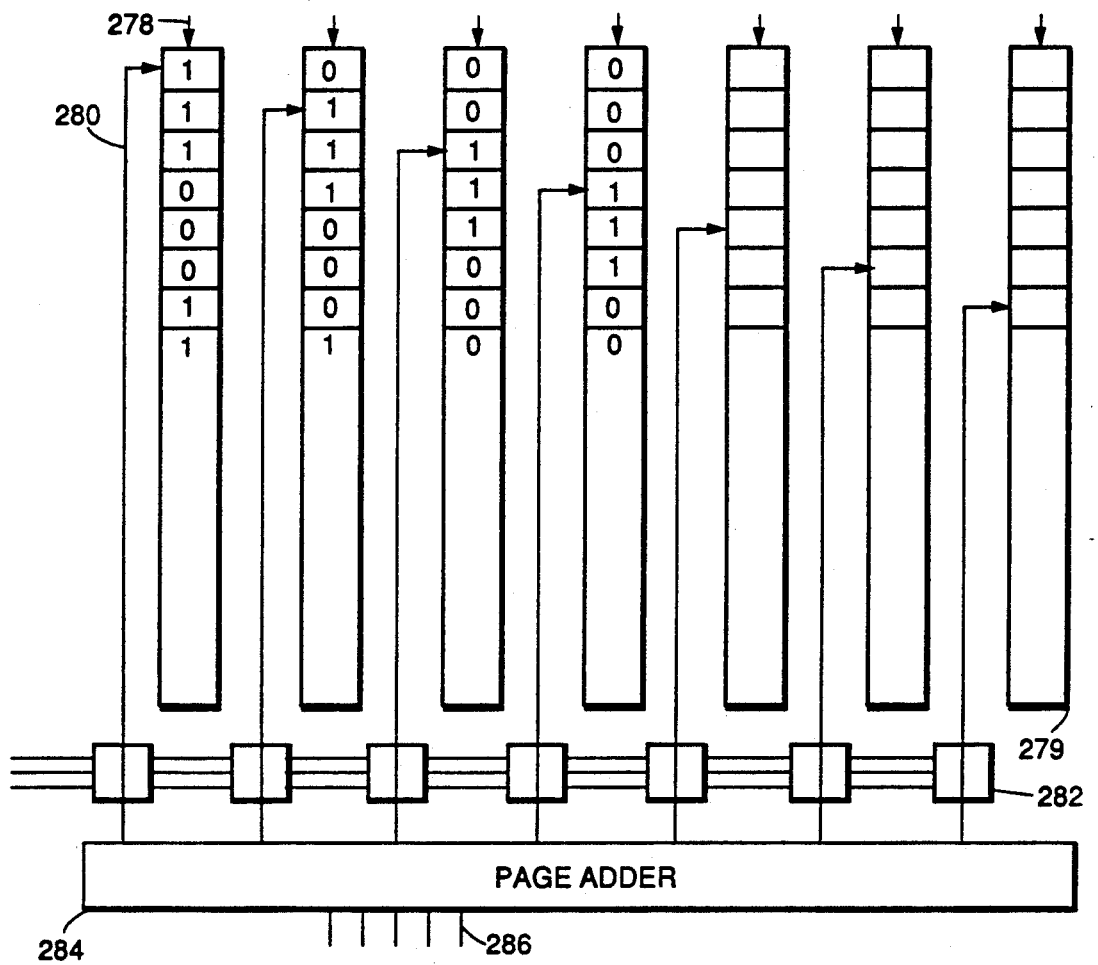
FIG. 23 is a schematic diagram of a shift register page from a beam-forming processor.

FIG. 23 is a schematic diagram of a shift register page 273 from a beam-forming processor. Accepting the binary digitized outputs 278 from each detector are binary shift registers 279, with one binary shift register for each detector organized into pages. The length of the registers 279 must typically exceed one complete cycle of the lowest intermediate frequency at the clock sample rate. If 1000 cells are shifting at 1 GHz, a lowest frequency of 1 MHz is possible. For the assumed number of detectors there will be 1,000 shift registers per page, with a total of 1,000 pages. Each binary shift register 279 has an addressable tap 280 to determine the direction of sight of the detector array. Addressable taps 280 are selected by addressable logic circuits 282. The appropriately delayed data is fed to a page adder 284. There will be 10 parallel data lines 286 output from each page adder 284, since the maximum sum in the adder 284 is 1000 and $2^{10}=1024$.

Figure 24A:
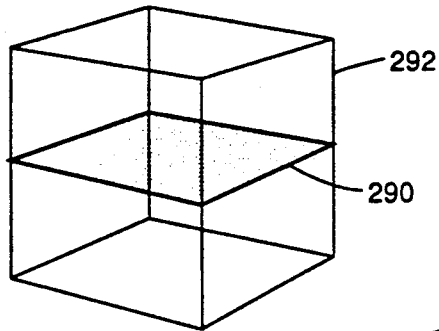
FIGS. 24a, 24b, and 24c are schematic perspective diagrams of three different beam-selection surfaces in a three-dimensional shift register array.
Figure 24B:
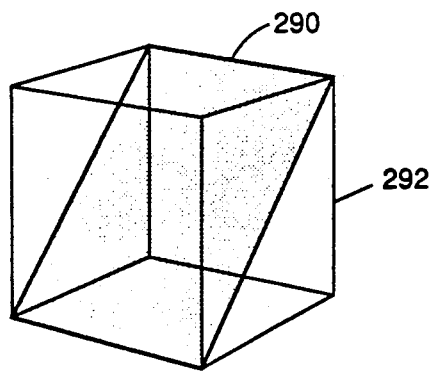
Figure 24C:
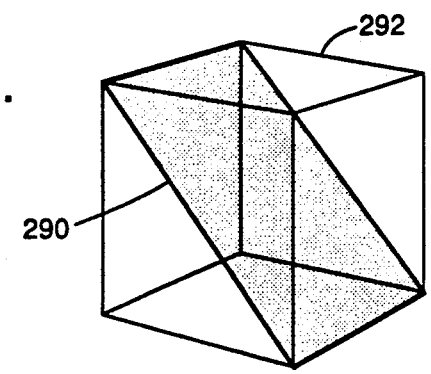

FIGS. 24a, 24b, and 24c are schematic perspective diagrams of three different beam-selection surfaces in a three-dimensional shift register array consisting of many shift register pages. To form a beam, all the signals from a tilted surface 290 in the shift register array 292 are added. The surface 292 is selected by machine addressable inputs. Focus and other curvatures can be selected.

Figure 25:
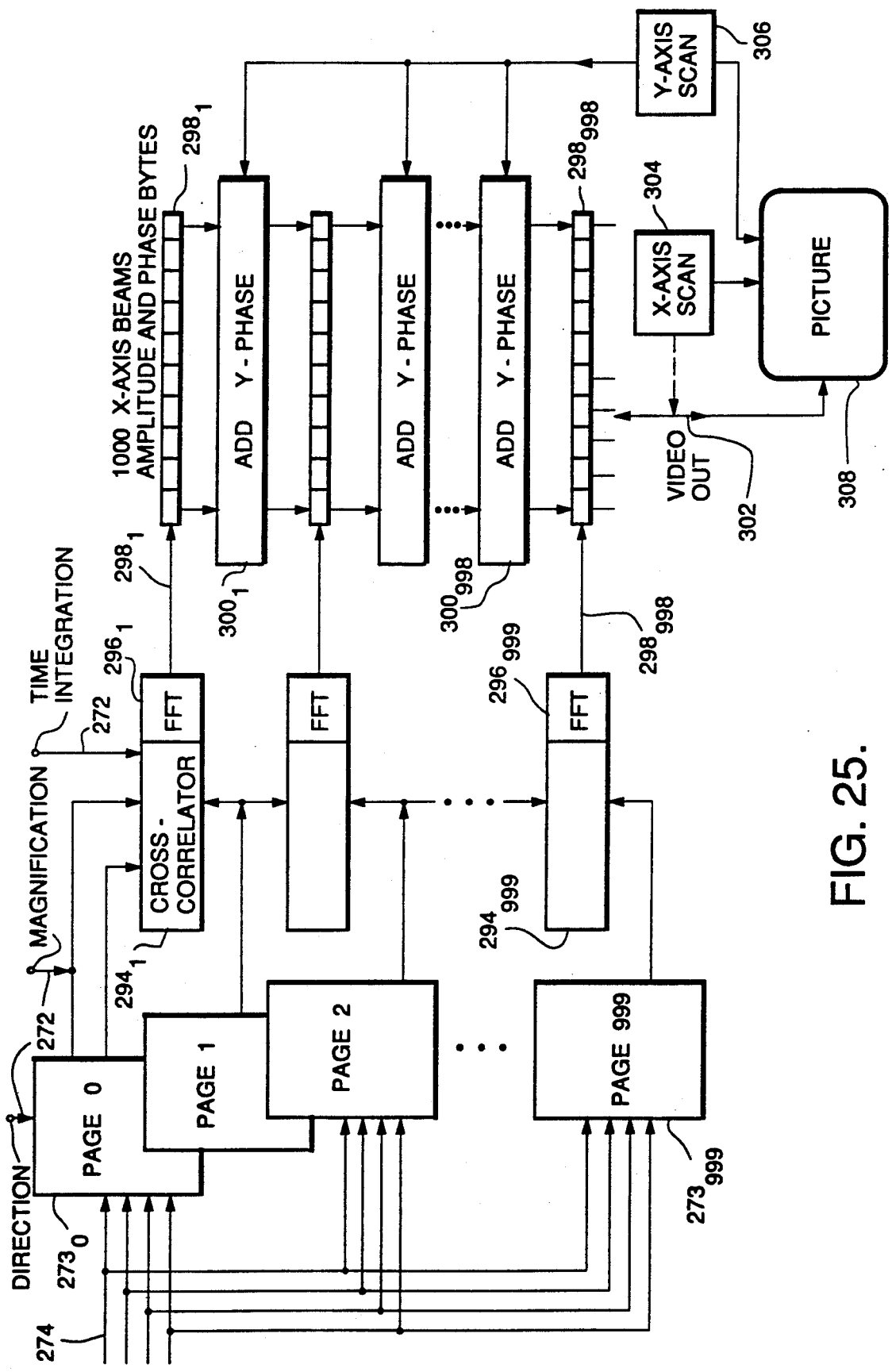
FIG. 25 is a schematic diagram of a beam-direction processor architecture.

FIG. 25 is a schematic diagram of the beam-direction processor architecture. Outputs 274 from the detector array go to shift register pages $273_0$ to $273_{999}$ in parallel. Direction, magnification, and integration time inputs 272 go to each page $273_0$–$273_{999}$ and cross-correlator $294_1$–$294_{999}$ units combined with a fast Fourier transform circuit $296_1$–$296_{999}$ The outputs $298_1$ through $298_{998}$ from cross-correlator $294_1$ and additional cross-correlators $294_2$ through $294_{998}$, representing the amplitudes and phases of 1000 "x-axis" beams, are added with appropriate y-phases $300_1$ through $300_{998}$ and converted to a video signal 302 Which is scanned by x-axis scan 304 and y-axis scan 306 to produce picture display 308 composed of $999 \times 1000$ pixels.

Extension to Optical Frequencies of Microwave Concepts

SPINNOR is a short-wavelength extension of some related concepts in U.S. Pat. No. 4,724,439, entitled "Microwave Radiometer Using Fanbeam Inversion," by Carl A. Wiley and Charles R. Edelsohn, assigned to the assignee of the present invention. SPINNOR requires different detectors and arrangements of detectors and A/D converters, but it synthesizes similar fanbeams and may use similar image reconstruction algorithms.

SPINNOR can operate in a passive imaging mode without a coherent illuminator. It functions as an imaging heterodyne radiometer at infrared wavelengths. Active illumination improves signal-to-noise ratios, which allows shorter integrating times. In addition, active illumination also provides range and doppler information in the reconstructed image.

The microwave implementation described in the patent application referred to above gets a wide field of view by using microwave apertures which have dimensions of the order of one wavelength. SPINNOR achieves wide fields of view by using many detectors which simultaneously look in many directions. The SPINNOR detector sizes given as an example above are (at 1 mm diameter) about 100 wavelengths in diameter.

The capture area of a single SPINNOR detector is not very large. Large capture area and correspondingly high sensitivity are provided by a very large number of detectors and associated preamplifiers and A/D converters. At longer wavelengths the implementation becomes easier. For example, a SPINNOR designed for a 100-$\mu$ wavelength (ten times larger than the previous example) uses detector elements having a ten-times-larger diameter and thus a 100-times-larger capture area. Such a 100-$\mu$ system requires the same number of preamplifiers and A/D converters as the previously discussed 10-$\mu$ system. Alternatively, a 100-$\mu$ system uses detector elements as small as the 10-$\mu$ system (1 mm diameter). The detectors each have a wider field of view and fewer detectors are required to map the total field of view. The effect of reducing capture area is to lower sensitivity and the effect of reducing the number of detectors is to require fewer preamplifiers and A/D converters.

Active illumination at a 100-$\mu$ wavelength may be provided by a Free Electron Laser. For passive imaging applications the 10- to 20-$\mu$ band is where room-temperature objects have maximum emissions. An imaging radiometer at these wavelengths has maximum sensitivity for a given capture area.

Stationary and Spinning Embodiments

As noted above, the Very Large Array radio telescope uses a spinning ground-based Y formation of detectors rotated by the earth's rotation. The SPINNOR concept can also be implemented as a nonspinning array with multiple arms. In such a case, the details of image reconstruction algorithms will in general be different, but the same general algorithms can still be employed. In fact, SPINNOR can be implemented as a large, completely filled circular array of detectors. In this limit it closely approximates a microwave phased-array receiver.

The spinning embodiments, whether single-arm or multiple-arm, have important practical advantages over nonspinning arrays. First, a nonspinning array may require careful platform stabilization to insure that it does not spin (as most conventional imaging telescopes require). Second, a single-arm or few-arm rotating system has simpler construction and lower mass than a large filled array. Third, it is much easier to feed a local-oscillator beam to a long one-dimensional array than a large two-dimensional array.

One-Dimensional Focusing by Cylindrical Elements

Figure 26:
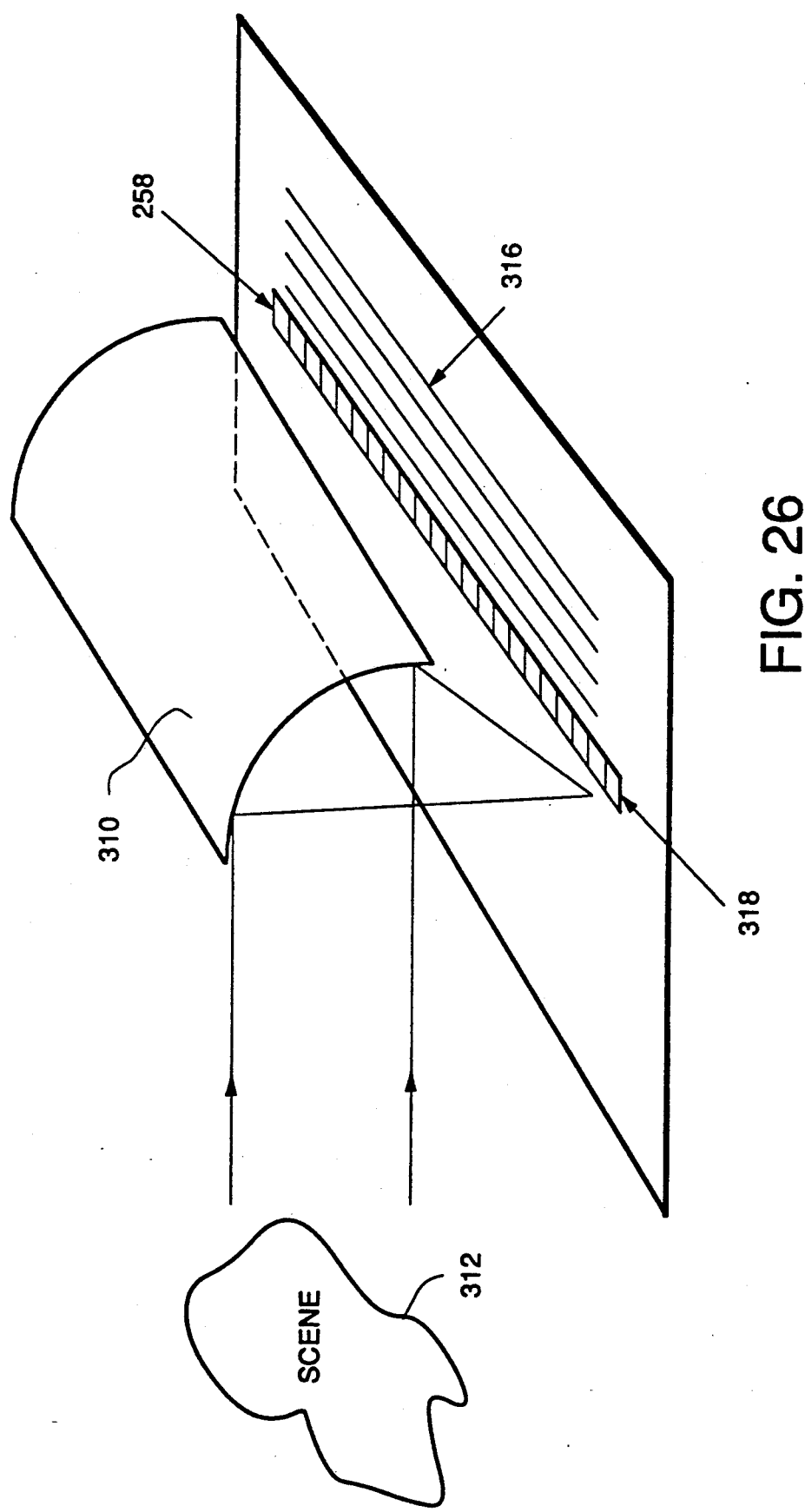
FIG. 26 is a schematic illustration of a one-dimensional telescope utilizing a cylindrical mirror to focus light from a scene onto a linear array of heterodyne detector elements.

Yet another embodiment of electronically phased arrays is illustrated in FIG. 26. In this embodiment, a cylindrical lens or curved mirror 310 serves to collect light from a large-area scene 312 and focus it in only one dimension. The cylindrical lens will produce a line focus, which represents a one-dimensional spatial Fourier transformation of the incoming waves. An extended scene, when imaged by a cylindrical lens, will appear as a series of light and dark streaks or bands 316 on the focal plane 314.

The focal plane 314 is provided with a linear array 318 of heterodyne detector elements, as shown. A local-oscillator laser source is provided to each detector, as previously described, by means of a discrete beamsplitter element or a guided wave beamsplitter. The resulting electrical signals from each detector element are recorded and computer processed to form an image.

Since the cylindrical lens has already provided a one-dimensional spatial Fourier transformation, the computer processing of the recorded signals need only perform an additional one-dimensional Fourier transformation to obtain an image. It is apparent that a linear detector array 318, as shown, does not sample energy from the entire field of view and cannot produce an image of the entire field of view. In fact, the electronic Fourier transformation will produce only a single scan line of image points or pixels which represent a small portion of the entire scene 312.

If the one-dimensional telescope is moved or rotated relative to the scene under observation, the rows of bright and dark bands 316 will scan across the linear detector array 318. Rapid repetitive electronic scanning of the heterodyne detector array 318 can sequentially build up a two-dimensional picture row by row. One-dimensional focusing has several general features which are useful in special applications:

1) A linear array of heterodyne detectors is simpler to fabricate than a two-dimensional array. The signal processing steps are substantially simpler, since only one-dimensional transformations are required. The total data rates are lower, since far fewer detectors are required. The principal motivation for using one-dimensional focusing is to reduce the number of heterodyne detector elements required to form a high-resolution image. A one-dimensional array might require typically 1000 detector elements. An equivalent two-dimensional array might require 1000 × 1000 = 1 million detector elements. Of course, the one-dimensional array would require 1000 times longer to make an image than the same size two-dimensional array. The one-dimensional array substitutes image scan time and software processing time for hardware complexity.

2) One-dimensional focusing with heterodyne detector arrays constitutes an electronic telescope which may be fabricated with much larger aperture and higher resolution than conventional telescopes. One-dimensional focusing increases the effective capture area of each detector element and has higher sensitivity than detector arrays without focusing optics. Cylindrical optical elements are easier to fabricate and less expensive than conventional two-dimensional focusing optical systems, particularly for very large apertures.

3) The electronic detection properties of one-dimensional focused telescopes have many features in common with the previously described two-dimensional embodiments. In particular, they are well suited to phased arrays of discrete and spatially separated telescopes.

FIG. 27 illustrates an array 320 of one-dimensional telescopes 322. The output of a laser local oscillator 324 is fed to each of the linear detector arrays 326, from which electrical signals 328 are input to A/D converters 330 before being fed into a computer memory 332. In order to form a synthetic aperture with an image resolution equivalent to the size of the entire array 320, it is necessary to coherently combine the detected signals from each of the one-dimensional subtelescopes 322.

The principal difficulty in combining signals is to correctly account for path length differences between the subtelescopes 322. By electronic heterodyne detection and recording, these so-called piston errors may be corrected by post detection processing, exactly as previously described for two-dimensional telescope arrays. Like two-dimensional systems, arrays of one-dimensional telescopes need not be rigidly held to optical tolerances in order to achieve large-aperture performance, which is a substantial advantage over conventional optically combined telescope arrays.

While the invention has been described with reference to specific embodiments, the exact nature and scope of the invention is defined in the following claims.

What is claimed is:

1. Optical imaging apparatus comprising:
   receiver means including a plurality of electro-optical detector means for receiving light from object space, each of said detector means being illuminated substantially near a pupil region of said apparatus producing first electrical signals representative of the amplitude and phase of said light;
   signal processing means in electrical communication with said plurality of detector means for producing second electrical signals representative of a phase coherent combination of the first electrical signals from the plurality of detector means, said signal processing means further comprising averaging means for averaging the phases of said first electrical signals over a period of time; and
   imaging forming means in electrical communication with the signal processing means for producing an optical image of the object space in response to said second electrical signals.

2. The apparatus of claim 1 wherein the receiver means provides a pupil surface and the detector means are located substantially near a pupil conjugate surface.

3. The apparatus of claim 2 wherein the detector means comprise a plurality of detectors each of which samples a portion of said pupil conjugate surface.

4. The apparatus of claim 1 wherein the receiver means provides a pupil surface which is sectionally reimaged into a plurality of pupil conjugate surfaces, each of said detector means being located substantially near respective ones of said pupil conjugate surfaces.

5. The apparatus of claim 1 wherein the plurality of detector means are arranged in a planar array.

6. The apparatus of claim 5 wherein the array is a randomly spaced array.

7. The apparatus of claim 1 wherein the detector means comprise heterodyne detector means for receiving light from object space.

8. The apparatus of claim 7 wherein the heterodyne detector means comprise local oscillator source means for producing a local oscillator beam, beam splitter means for interfering the local oscillator beam with the light received from object space, and fiber optic means for communicating said local oscillator beam from the local oscillator source means to the beam splitter means.

9. The apparatus of claim 8 wherein the local oscillator source means comprises a source of coherent light.

10. The apparatus of claim 1 wherein the receiver means comprises telescope means for receiving said light from object space and directing it onto said detector means.

11. The apparatus of claim 10 wherein said telescope means comprise a plurality of telescopes each of which is associated with one of said detector means for directing said received light onto said associated detector means.

12. The apparatus of claim 11 wherein each of said telescopes comprises means for independent pivotal movement of said telescope.

13. The apparatus of claim 10 wherein said telescope means consists essentially of a single telescope associated with said plurality of detector means for directing said received light onto said plurality of detector means.

14. The apparatus of claim 10 wherein said telescope means comprise reflecting Cassegrain telescope means.

15. The apparatus of claim 10 wherein each of said detector means comprises heterodyne detector means.

16. The apparatus of claim 15 wherein said heterodyne detector means comprise a plurality of electro-optical detector elements.

17. The apparatus of claim 1 wherein the signal processing means further comprises averaging means for averaging the phases separately for each of said detector means.

18. The apparatus of claim 1 wherein the signal processing means comprise Fourier transform means for producing phase signals representative of the phases of said first electrical signals separately for each of said detector means.

19. The apparatus of claim 18 further comprising accumulator means for producing accumulation signals representative of a separate summation for each of said phase signals over a period of time.

20. The apparatus of claim 19 further comprising inverse Fourier transform means in electrical communication with said accumulator means for providing said second electrical signals in response to said accumulation signals for the plurality of detector means.

21. The apparatus of claim 19 wherein the Fourier transform means means for producing an integration time which is faster than atmospheric turbulence phase variations introduced into said light from object space.

22. The apparatus of claim 18 wherein said phase signals comprise separate in-phase and quadrature signals, and further comprising shift register means in electrical communication with said Fourier transform means for separately storing said in-phase and quadrature signals in a plurality of discrete frequency increments.

23. The apparatus of claim 22 further comprising accumulator means in electrical communication with said shift register means for producing accumulation signals representative of a separate summation for each of said in-phase and quadrature signals in said discrete frequency increments over a period of time.

24. The apparatus of claim 23 further comprising inverse Fourier transform means in electrical communication with said accumulator means for producing separate ones of said second electrical signals in response to said accumulation signals.

25. The apparatus of claim 18 wherein the signal processing means further comprise inverse Fourier transform means for producing said second electrical signals in response to said phase signals from the plurality of detector means.

26. The apparatus of claim 25 further comprising means for separating said phase signals into a plurality of discrete frequency increments, said inverse Fourier transform means producing separate ones of said second electrical signals for each of said discrete frequency increments.

27. The apparatus of claim 26 wherein the image forming means comprise adding means for adding said separate ones of the second electrical signals to produce composite image signals, and display means for producing said optical image in response to said composite image signals.

28. The apparatus of claim 18 further comprising analog-to-digital converter means in electrical communication with said detector means for producing digital samples of said first electrical signals at selected time intervals, and shift register means in electrical communication with said analog-to-digital converter means for storing separate pluralities of said digitized samples, said Fourier transform means producing separate ones of said phase signals for each plurality of digitized samples stored in the shift register means.

29. The apparatus of claim 1 wherein said receiver means comprises:
a plurality of spaced-apart heterodyne optical detectors;
local oscillator means for providing a local oscillator beam of light; and
a plurality of beamsplitting means for splitting said local oscillator beam into a plurality of portions which enter individual said detectors.

30. The apparatus of claim 29 wherein said detectors are spaced apart and arranged along a line, said beamsplitting means are positioned in adjacent relationship to said detectors, and said oscillator beam travels adjacent said detectors along said line.

31. The apparatus of claim 30 wherein said beamsplitting means are tilted glass plates with partially reflecting and partially transmitting coatings thereon.

32. The apparatus of claim 31 wherein said glass plates are tilted through a progressively greater angle along said line of detectors.

33. The apparatus of claim 29 wherein said local oscillator means comprises a source of coherent light aimed at said beamsplitting means.

34. The apparatus of claim 29 wherein said plurality of detectors comprises a regular array.

35. The apparatus of claim 1 wherein said receiver means comprises:
an array of heterodyne optical detectors spaced apart and arranged along a line, with a thin strip of transparent waveguide material overlying said detectors;
local oscillator means for providing a local oscillator beam which travels along said waveguide; and
a plurality of diversion means on a surface of said waveguide opposite said detectors, for diverting part of said local oscillator beam into a plurality of portions which enter individual said detectors.

36. The apparatus of claim 35 wherein said diversion means comprise a plurality of diffraction grating areas superimposed on said surface of said waveguide, each said grating area being in substantial spatial registration with a detecting area of a corresponding underlying detector;
wherein said local oscillator beam which travels along said waveguide is locally diffracted into a plurality of portions which enter said detectors below said grating areas.

37. The apparatus of claim 36 wherein said diffraction grating areas comprise corrugations in said waveguide surface.

38. The apparatus of claim 35 wherein said local oscillator means comprises a laser.

39. The apparatus of claim 38 wherein said laser operates simultaneously at a plurality of frequencies and said signal processing means has a bandwidth into which said first electrical signals are heterodyned.

40. Phased array imaging apparatus comprising:
a plurality of detector means for receiving radiation from object space, each of said detector means producing first electrical signals representative of the amplitude and phase of said radiation at each of said detector means;
signal processing means in electrical communication with said plurality of detector means for producing second electrical signals representative of a phase coherent combination of the first electrical signals from the plurality of detector means; and
image forming means in electrical communication with the signal processing means for producing an image of the object space in response to said second electrical signals;
said signal processing means comprising Fourier transform means for producing phase signals representative of the respective phases of said first electrical signals separately for each of said detector means;
accumulator means for providing accumulation signals representative of a separate summation for each of said phase signals over a period of time; and
inverse Fourier transform means for producing said second electrical signals in response to said phase signals from the plurality of detector means.

41. The apparatus of claim 40 further comprising means for separating said phase signals into a plurality of discrete frequency increments, said inverse Fourier transform means producing separate ones of said second electrical signals for each of said discrete frequency increments.

42. The apparatus of claim 41 wherein the image forming means comprises adding means for adding said separate ones of the second electrical signals to produce composite image signals, and display means for producing said image in response to said composite image signals.

43. The apparatus of claim 40 wherein said phase signals comprise separate in-phase and quadrature signals, and further comprising shift register means in electrical communication with said Fourier transform means for separately storing said in-phase and quadrature signals in a plurality of discrete frequency increments, said accumulator means being in electrical communication with said shift register means for producing accumulation signals representative of a separate summation for each of said in-phase and quadrature signals in said discrete frequency increments over a period of time.

44. A method for optical imaging comprising:
illuminating a plurality of electro-optical detectors substantially near a pupil region of an apparatus comprising said detectors, which detects light from object space, said detectors producing first electrical signals representative of the amplitude and phase of said light;
producing second electrical signals representative of a phase coherent combination of the first electrical signals from the plurality of detectors including the step of averaging the phases of said first electrical signals over a period of time; and
producing an optical image of the object space in response to said second electrical signals.

45. The method of claim 44 further comprising calculating the Fourier transform of said first electrical signals separately for each of said electro-optical detectors to produce phase signals and amplitude signals.

46. The method of claim 45 further Comprising separately summing and averaging each of said phase signals and said amplitude signals over a period of time.

47. The method of claim 46 wherein the Fourier transform is calculated with an integration time which is shorter than atmospheric turbulence phase variations introduced into said light from object space.

48. The method of claim 45 further comprising calculating the inverse Fourier transform to produce said second electrical signals in response to said phase signals for the plurality of detector means.

49. The method of claim 48 further comprising separating said phase signals into a plurality of discrete frequency increments, and calculating said inverse Fourier transform separately for each of said discrete frequency increments to produce separate ones of said second electrical signals.

50. The method of claim 49 further comprising adding said separate ones of the second electrical signals to produce composite image signals, and displaying an optical image in response to said composite image signals.

51. A method for processing signals from an array of detectors receiving radiation from object space comprising:
producing first electrical signals representative of the amplitude and phase of said radiation at each of said detectors;
calculating the Fourier transform of said first electrical signals separately for each of said detectors to produce phase signals;
separately summing each of said phase signals over a period of time;
calculating the inverse Fourier transform to produce second electrical signals representative of a phase coherent combination of the first electrical signals in response to said phase signals from the plurality of detector means; and
producing an image of the object space in response to said second electrical signals.

52. The method of claim 51 further comprising separating said phase signals into a plurality of discrete frequency increments, and calculating said inverse Fourier transform separately for each of said discrete frequency increments to produce separate ones of the said second electrical signals.

53. The method of claim 52 further comprising adding said separate ones of the second electrical signals to produce composite image signals, and displaying an imaging in response to said composite image signals.

54. A method for forming an image of a scene comprising:

detecting radiation received by an array of optical detectors along directions of incidence of said radiation with respect to a direction centrally and outwardly normal to said array, said directions having predetermined relative orientations and said detectors providing an output as a function of said radiation;

rotating said array with respect to a distant source of said radiation;

sensing an orientation of said array and providing an output as a function of the rotational orientation of said array;

transforming said output from said array into radiation functions, each of said radiation functions corresponding to a respective rotational orientation; and reconstructing an image of the radiation from said scene from said radiation functions and their respective rotational orientations.

55. An imaging system for forming an image of a scene comprising:

an array of optical detectors for providing an output as a function of light radiation received along directions of incidence of said radiation with respect to a direction centrally and outwardly normal to said array, said directions having predetermined relative orientations;

rotation means for rotating said array with respect to a distant source of said radiation;

orientation sensing means for providing an output as a function of the rotational orientation of said array;

transformation means for transforming said output from said array and said orientation sensing means into radiation functions, each of said radiation functions corresponding to a respective rotational orientation; and computing means for reconstructing an image of the radiation from said scene from said radiation functions and their respective rotational orientation.

56. The imaging system of claim 55 wherein said array of detectors comprises a linear array for providing an output as a function of radiation received along directions of incidence of said radiation with respect to a longitudinal axis of said array.

57. The imaging system of claim 55 wherein said radiation function is a spatial frequency spectrum of said scene.

58. The imaging system of claim 55 wherein said radiation function is a projection of radiation received from the scene.

59. The imaging system of claim 56 wherein said computing means includes means for correcting for detector field of view.

60. The imaging system of claim 59 wherein said fields of view of said detectors comprise diffraction limited fields of view and said means for correcting for detector field of view corrects for the shape of said detector fields of views.

61. The imaging system of claim 55 wherein said array includes means for frequency scanning.

62. The imaging system of claim 55 wherein said array includes means for delay scanning.

63. The imaging system of claim 55 wherein said array includes means for mechanical scanning.

64. An optical imaging apparatus for imaging a scene comprising:

a super array of a plurality of detector arrays of optical heterodyne detectors;

local oscillator means for supplying a reference light beam to each said optical heterodyne detector of each said array for mixing with signal light from said scene;

means for scanning an entrance pupil of each said array in synchrony over a range of angles;

postdetection processing means in electrical communication with said detectors for producing electrical signals representative of a phase-coherent combination of subimages corrected for path length differences between each said array; and image forming means in electrical communication with said postdetection processing means for producing an optical image of said scene from said electrical signals.

65. The optical imaging apparatus of claim 64 wherein each said detector array includes a substantially planar arrangement of a plurality of spaced-apart detectors.

66. The optical imaging apparatus of claim 64 wherein said super array comprises a two-dimensional arrangement of one-dimensional arrays of optical heterodyne detectors which are spaced apart with their line axes parallel to each other.

67. A method of selecting a portion of the field of view of light-receiving and imaging apparatus, comprising the steps of:

supplying a local oscillator beam to each detector in an array of spaced-apart detectors in a predetermined pattern of spatial locations;

arranging progressively tilted beamsplitters adjacent said detectors, each said beamsplitter being associated with a particular detector in said array;

scanning each said beamsplitter through a predetermined range of angles about a central position;

electronically choosing certain detector signals in combination;

processing said signals to account for signal path length differences between detectors and produce a phase-coherent combination of subimage signals of said scene; and forming an image from said subimage signals.

68. A method of forming an optical image of a scene comprising:

producing a reference beam of light comprising a plurality of discrete frequencies;

detecting light from said scene with an array of heterodyne optical detector elements responsive to light from said scene and from said reference beam;

producing first electrical signals as outputs of said detectors in response to said light from said scene from and from said reference beam;

controllably sweeping said reference beams through a range of angles with respect to a normal to the surface of each said detector element;

processing said first electrical signals to produce second electrical signals representative of a phase-coherent combination of said first electrical signals from said array of detector elements; and forming an optical image of said scene with means responsive to said second electrical signals.

69. A method of forming an optical image of a scene comprising:

focusing incoming light to a focal line with a generally cylindrical optical component having an entrance pupil;

scanning said entrance pupil over a range of angles;

disposing a linear array of heterodyne optical detectors at the focal line of said cylindrical optical component and producing a repetitive sequence of first electrical output signals in response to said light focused on said detectors by said cylindrical optical component;

supplying a reference light beam to each heterodyne optical detector for mixing with signal light from said scene;

processing said first electrical output signals to produce second electrical signals representative of a phase-coherent combination of said first electrical signals from said detectors; and forming an optical image of said scene from said second electrical signals.

70. An apparatus for optical imaging of a scene comprising:

a generally cylindrical optical component which focuses incoming light to a focal line, having an entrance pupil;

means for scanning said entrance pupil over a range of angles;

a linear array of optical heterodyne detectors at the focal line of said cylindrical optical component, producing a repetitive sequence of first electrical output signals in response to light focused on said detectors by said cylindrical optical component;

local oscillator means for supplying a reference light beam to each optical heterodyne detector for mixing with signal light from said scene;

signal processing means in electrical communication with said optical heterodyne detectors for processing said first electrical signals to produce second electrical signals representative of a phase-coherent combination of said first electrical signals from said detectors; and image forming means in electrical communication with said signal processing means for producing an optical image of said scene from said second electrical signals.

71. The apparatus of claim 70 wherein said signal processing means includes means for performing a Fourier transformation of each said sequence of line-image signals from said linear array of optical heterodyne detectors.

72. The apparatus of claim 70 wherein said local oscillator means supplies a reference light beam comprising a plurality of frequencies, and said signal processing means has a bandwidth into which said first electrical signals are heterodyned.

* * * * *